(12) United States Patent
Suzuki et al.

(10) Patent No.: US 6,989,738 B2
(45) Date of Patent: Jan. 24, 2006

(54) WARNING APPARATUS FOR VEHICLE

(75) Inventors: Tatsuya Suzuki, Yokosuka (JP);
Takeshi Kimura, Yokohama (JP);
Genpei Naito, Yokohama (JP);
Naotaka Usui, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 46 days.

(21) Appl. No.: 10/699,646

(22) Filed: Nov. 4, 2003

(65) Prior Publication Data

US 2004/0090320 A1    May 13, 2004

(30) Foreign Application Priority Data

Nov. 12, 2002   (JP) .............................. 2002-328170

(51) Int. Cl.
*B60Q 1/00*         (2006.01)
(52) U.S. Cl. ...................... 340/436; 340/435; 340/903; 340/904; 701/96
(58) Field of Classification Search ................ 340/435, 340/436, 438, 903, 904; 701/93, 96, 301; 180/178, 179, 271; 342/70, 71
See application file for complete search history.

(56) References Cited

U.S. PATENT DOCUMENTS

| 5,410,484 A | * | 4/1995 | Kunimi et al. ................. 701/70 |
| 5,459,460 A | * | 10/1995 | Nishino ....................... 340/903 |
| 5,684,473 A | * | 11/1997 | Hibino et al. ................ 340/903 |
| 6,044,321 A | * | 3/2000 | Nakamura et al. ............ 701/96 |

FOREIGN PATENT DOCUMENTS

| JP | 5-024524 A | 2/1993 |
| JP | 7-069188 A | 3/1995 |
| JP | 9-286313 A | 11/1997 |

* cited by examiner

*Primary Examiner*—Van T. Trieu
(74) *Attorney, Agent, or Firm*—Foley & Lardner LLP

(57) ABSTRACT

In a warning apparatus for a vehicle, a primary controller (5) calculates a collision time (TTC) according to the distance between the vehicle and an object that is present in front of the vehicle and a relative speed between the vehicle and the front object. According to the collision time, the primary controller sets a correction value (Fc) for at least one of the driving force and braking force of the vehicle and provides a contact possibility warning by applying a negative acceleration to the vehicle according to the correction value. The correction value is set according to comparison between the collision time and a threshold and according to the collision time. A resilient coefficient (k_TTC) of a virtual spring (502) is increased so that the correction value may increase as the speed of the vehicle increases.

34 Claims, 15 Drawing Sheets

LONG DISTANCE TO FRONT VEHICLE

SHORT DISTANCE TO FRONT VEHICLE

WARNING APPARATUS FOR VEHICLE

CROSS REFERENCE TO RELATED APPLICATION

This application claims benefit of priority under 35USC §119 to Japanese Patent Applications No. 2002-328170, filed on Nov. 12, 2002, the entire contents of which are incorporated by reference herein.

BACKGROUND OF THE INVENTION

1. Field of the Invention

The present invention relates to a warning apparatus for a vehicle, to provide a contact possibility warning by conducting deceleration control according to the possibility of the vehicle contacting with an object that is present in front of the vehicle.

2. Description of the Related Art

There is a technique of providing the driver of a vehicle with a contact possibility warning in order to prevent the vehicle from colliding with a front object such as a vehicle running in front of the vehicle in question. Such a technique of proving a contact possibility warning detects a front object of a vehicle with a laser radar or a radio radar and warns of a possibility of the vehicle contacting with the detected front object by sending an alarm sound or by conducting deceleration control. Such warning operations as emitting an alarm sound and conducting deceleration control reduce or prevent the possibility of the vehicle hitting the front object. Japanese Unexamined Patent Application Publication No. 9-286313 discloses a technique to provide the driver of a vehicle with a deceleration shock as a warning. This disclosure increases the level of the deceleration shock in response to vehicle speed so that the driver may sense a deceleration shock of equivalent level irrespective of vehicle speed.

SUMMARY OF THE INVENTION

Generally, in a case where the speed of a vehicle is high, a distance between the vehicle and a front running vehicle is sufficiently large. In this case, if the degree of deceleration serving as a contact possibility warning is too large, it may annoy the driver. During such high-speed driving, however, it is necessary to provide the driver with a contact possibility warning.

In consideration of this situation, the present invention provides a warning apparatus for a vehicle capable of effectively providing the driver with a contact possibility warning without annoying the driver.

According to an embodiment of the present invention, an information providing apparatus for a vehicle includes: an operation part configured to provide a contact possibility of the vehicle contacting with an object that is present in front of the vehicle according to relative motion between the vehicle and the object; an information providing unit configured to provide contact possibility information by applying a negative acceleration to the vehicle, the negative acceleration being produced according to a correction value that is set by the information providing unit according to the contact possibility and is applied to at least one of the driving force and the braking force of the vehicle; and a controller configured to change the correction value according to a speed of the vehicle.

DESCRIPTION OF THE PREFERRED EMBODIMENT

Various embodiments of the present invention will be explained in detail with reference to the accompanying drawings. In the following explanation, a vehicle to which the present invention is applied or in which the warning apparatus of the present invention is installed is sometimes referred to as the "own vehicle," and the running speed of the own vehicle is sometimes referred to as the "own vehicle speed."

Figure 1:
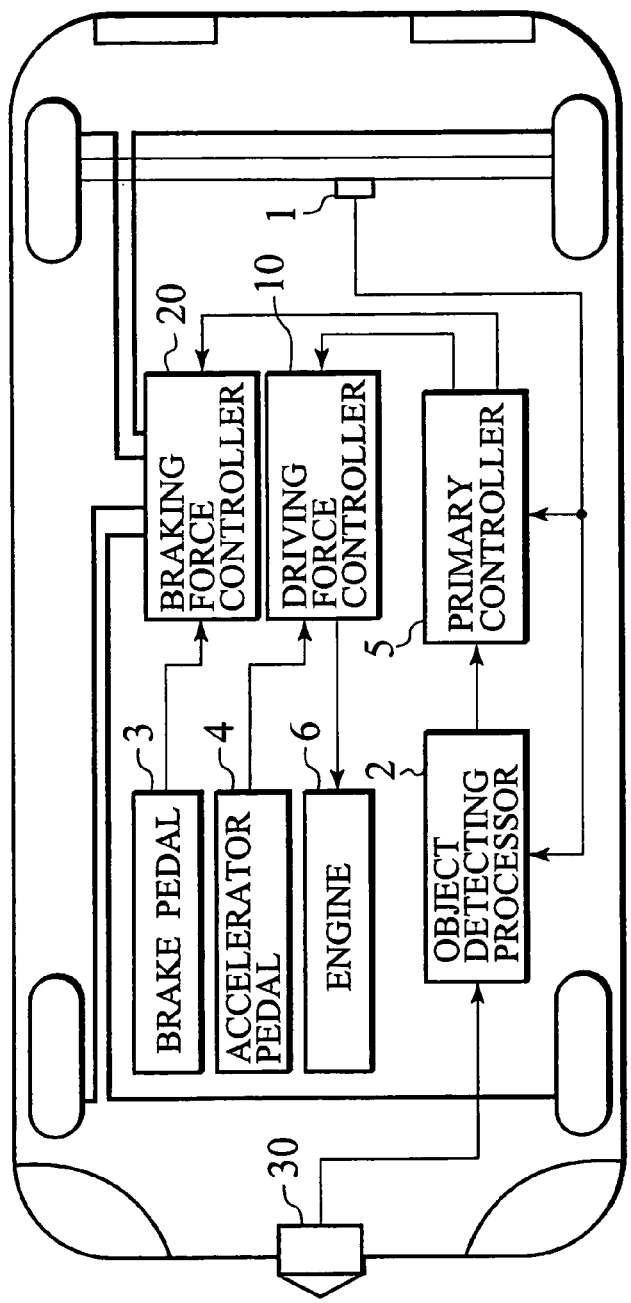
FIG. 1 shows a drive control system of a vehicle employing a warning apparatus according to an embodiment of the present invention.

FIG. 1 shows a drive control system of a vehicle employing a warning apparatus according to the embodiment of the present invention.

The drive control system includes a radar 30, a vehicle speed sensor 1, an object detecting processor 2, a brake pedal 3, an accelerator pedal 4, a braking force controller 20, a driving force controller 10, a primary controller 5, and an engine 6. Although not particularly shown, the vehicle naturally includes other components such as a steering angle sensor. The driving force controller 10 controls the engine 6 so that the engine 6 may generate a driving force corresponding to a stroke of the accelerator pedal 4 as an accelerating operator. The driving force controller 10 is also designed to change the driving force in response to an external command.

Figure 2:
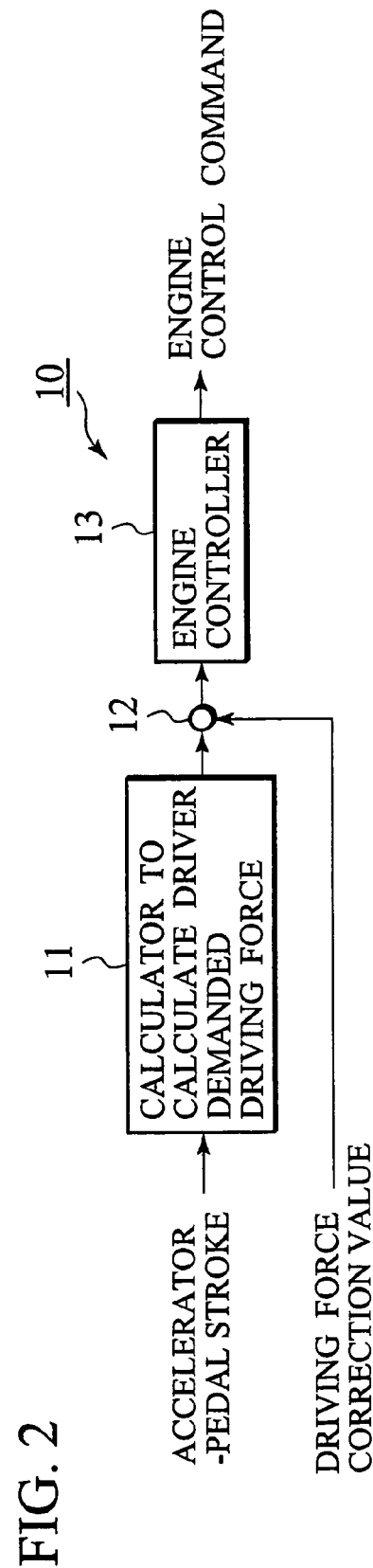
FIG. 2 is a block diagram showing a driving force controller in the drive control system.
Figure 3:
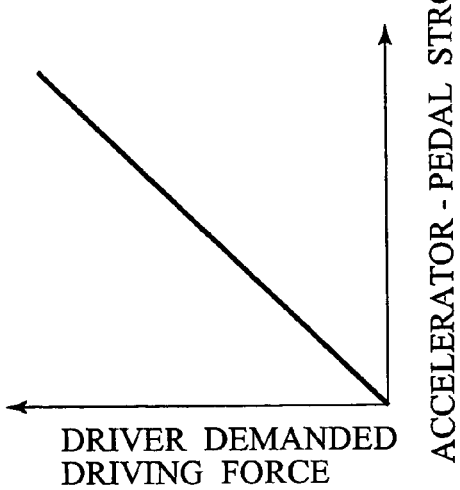
FIG. 3 is a characteristic diagram showing a relationship between accelerator pedal strokes and driver demanded driving force.

FIG. 2 is a block diagram showing the driving force controller 10. The driving force controller 10 includes a calculator 11 to calculate a driving force demanded by the driver of the vehicle, an adder 12, and an engine controller 13. The calculator 11 calculates a driving force demanded by the driver (hereinafter referred to as the driver demanded driving force) according to a stroke of the accelerator pedal 4 (hereinafter referred to as the accelerator-pedal stroke). The calculator 11 employs a characteristic diagram (hereinafter referred to as the driver demanded driving force calculating map) such as the one shown in FIG. 3 defining a relationship between accelerator-pedal strokes and driver demanded driving force, to find a driver demanded driving force corresponding to a given accelerator-pedal stroke. The calculator 11 provides the found driver demanded driving force to the engine controller 13 through the adder 12. The driver demanded driving force calculating map is stored in the calculator 11. The engine controller 13 provides a control command to the engine 6 according to the driver demanded driving force as a target driving force. Based on the control command, the engine 6 is driven. In the driving force controller 10, the adder 12 receives a driving force correction value. Upon receiving the driving force correction value, the adder 12 adds the correction value to a driver demanded driving force and provides a target driving force, i.e., a corrected driver demanded driving force. In this way, in the driving force controller 10, the calculator 11 calculates a driver demanded driving force according to an accelerator-pedal stroke, and if there is an input driving force correction value, the adder 12 adds the correction value to the driver demanded driving force and provides the sum as a target driving force. Then, the engine controller 13 provides a control command corresponding to the target driving force.

Figure 4:
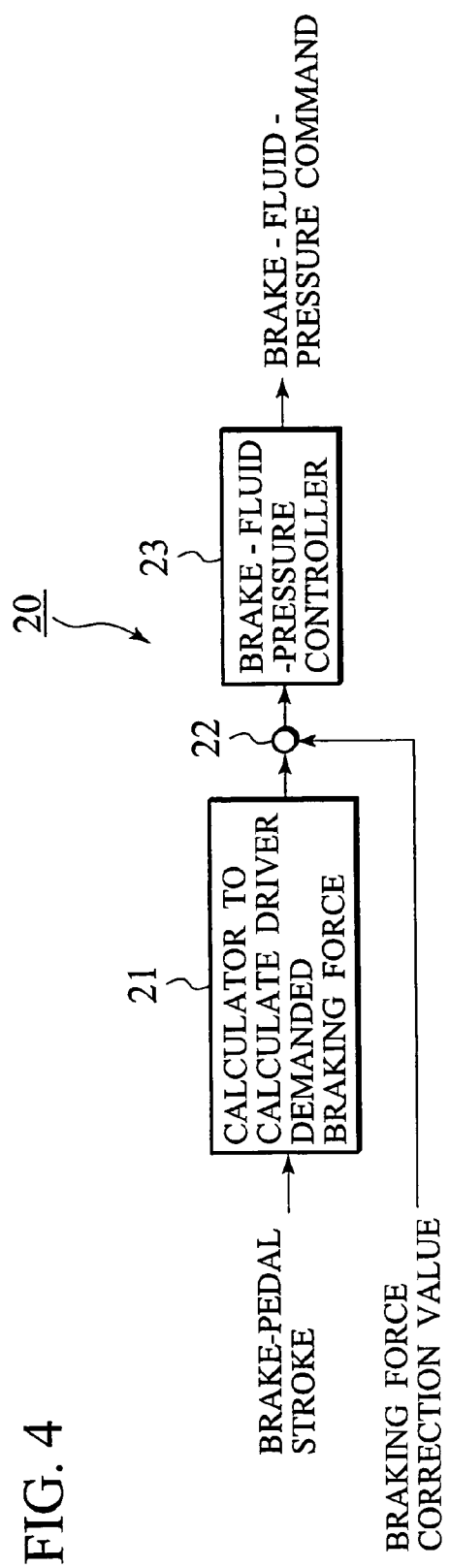
FIG. 4 is a block diagram showing a braking force controller in the drive control system.

The braking force controller 20 of the present embodiment controls brake fluid pressure to generate a braking force corresponding to a stroke of the brake pedal 3 as a braking operator. The braking force controller 20 is also designed to change the braking force according to an external command. FIG. 4 is a block diagram showing the braking force controller 20. The braking force controller 20 includes a calculator 21 to calculate a braking force demanded by the driver, an adder 22, and a brake fluid pressure controller 23.

Figure 5:
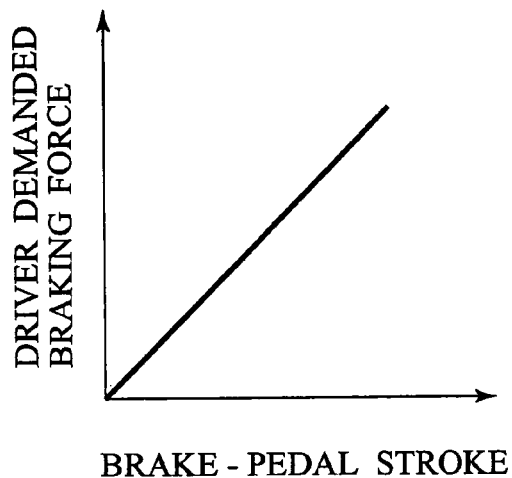
FIG. 5 is a characteristic diagram showing a relationship between brake pedal strokes and driver demanded braking force.

The calculator 21 calculates a braking force demanded by the driver (hereinafter referred to as the driver demanded braking force) according to a stroke of the brake pedal 3 (hereinafter referred to as the brake-pedal stroke). The calculator 21 employs a characteristic diagram (hereinafter referred to as the driver demanded braking force calculating map) such as one shown in FIG. 5 defining a relationship between brake-pedal strokes and driver demanded braking force, to find a driver demanded braking force corresponding to a given brake-pedal stroke. The calculator 21 provides the found driver demanded braking force to the brake fluid controller 23 through the adder 22. The driver demanded braking force calculating map is stored in the calculator 21.

The brake fluid pressure controller 23 provides a brake fluid pressure command according to a given driver demanded braking force as a target braking force. In the braking force controller 20, the adder 22 receives a braking force correction value. Upon receiving the braking force correction value, the adder 22 adds the correction value to a driver demanded braking force and provides the corrected driver demanded braking force as a target braking force.

In this way, in the braking force controller 20, the calculator 21 calculates a driver demanded braking force according to a brake-pedal stroke, and if a braking force correction value is inputted, the adder 22 adds the correction value to the driver demanded braking force and provides the sum as a target braking force. According to the target braking force, the brake fluid pressure controller 23 provides a brake fluid pressure command.

Figure 6:
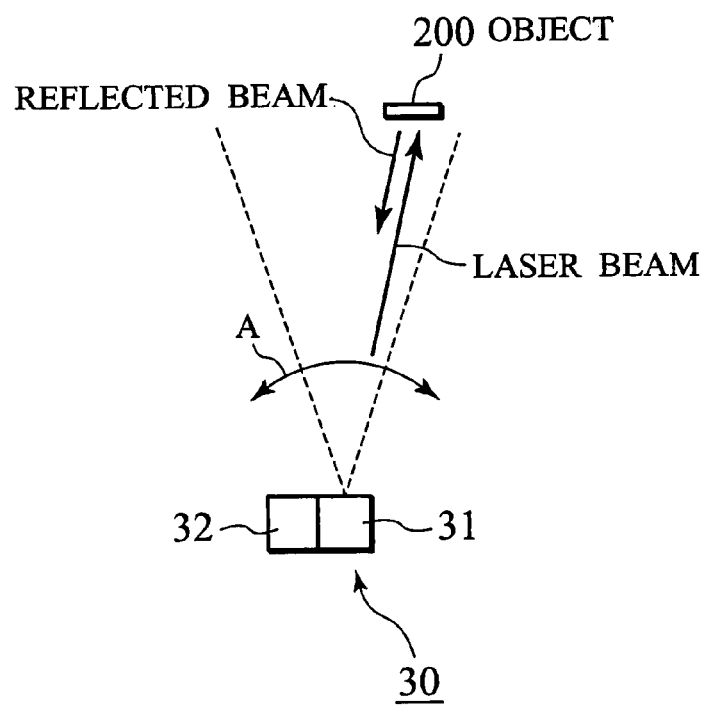
FIG. 6 shows a radar in the drive control system.

The radar 30 of the present embodiment is installed at a front part of the vehicle as shown in FIG. 1, to calculate a distance to a front object. FIG. 6 shows an exemplary structure of the radar 30. The radar 30 includes an emitter 31 to emit an infrared laser beam and a photosensor 32 to receive a reflection of the laser beam and provide a voltage representative of the received reflection. The emitter 31 and photosensor 32 are arranged adjacent to each other. The emitter 31 is combined with a scanning mechanism to scan the emitter 31 in the directions indicated with an arrow mark A in FIG. 6. The emitter 31 emits a laser beam by sequentially changing the angle thereof within a predetermined angular range. The radar 30 measures a distance between the vehicle and a front object 200 according to a time difference between the emission of a laser beam from the emitter 31 and the reception of a reflected beam by the photosensor 32.

As mentioned above, the scanning mechanism scans the emitter 31 and the radar 30 determines, at each scan position or a scan angle, the intensity of a received reflected beam and an angular distribution. If it is determined that there is an object 200 in front of the vehicle, the radar 30 calculates a distance to the front object 200. According to the distance to the front object 200 and a scan angle at the detection of the front object 200, the radar 30 also calculates a left-right position of the front object 200 relative to the vehicle. Namely, the radar 30 is configured to determine a relative position of the object 200 with respect to the vehicle.

Figure 7:
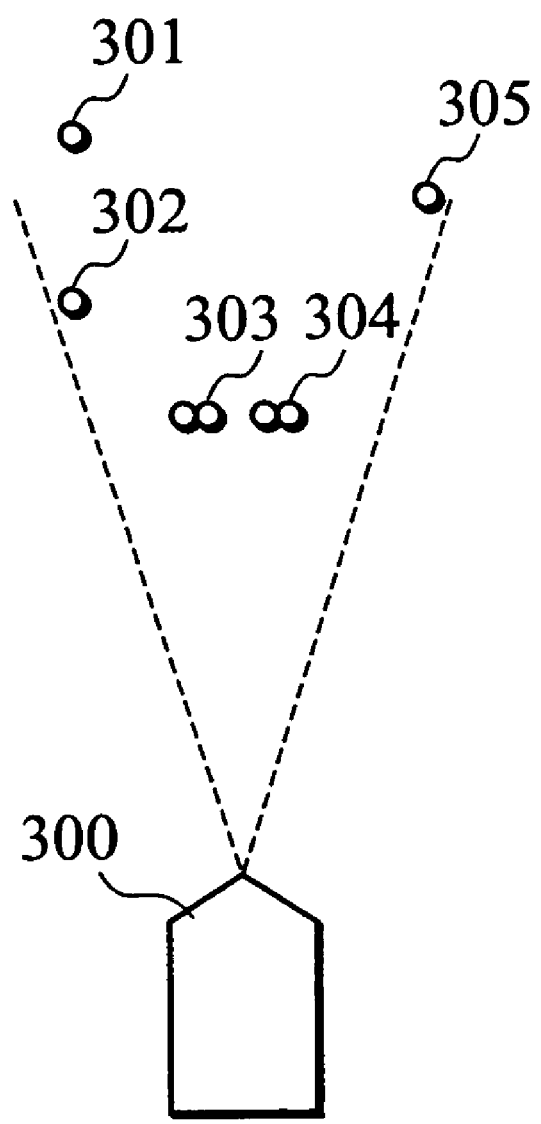
FIG. 7 shows objects detected by scanning with the radar.

FIG. 7 shows examples of objects detected by the scanning operation of the radar 30 installed at a front part of the vehicle 300. At each scan angle, the radar 30 determines a relative position of each object relative to the vehicle and provides a plan view of objects detected within a scanning range as shown in FIG. 7. The radar 30 is not limited to the one employing the optical emitter 31 that emits infrared beams. The emitter 31 may be of a radio type that emits microwaves, millimeter waves or sub-millimeter waves. Alternatively, the radar 30 may be an apparatus that processes video images to detect the presence, position, and relative motion of a front object 200. The radar 30 provides the detected result to the object detecting processor 2.

The object detecting processor 2 is configured to obtain information about the front object 200 according to the detected result provided by the radar 30. More precisely, the object detecting processor 2 compares object presence states provided by the radar 30 at scanning intervals (scan angles) with each other and determines the motion of each object. At the same time, the object detecting processor 2 determines whether the detected objects represent an identical object or different objects according to information concerning the proximity and similarity of the detected objects.

Through these processes, the object detecting processor 2 provides a distance X (m) to a detected front object in a front-rear direction, a distance Y (m) to the front object in a left-right direction, a width W (m) of the front object, and a relative speed ΔV (m/s) between the running speed of the vehicle and the moving (running) speed of the object If the object detecting processor 2 detects a plurality of objects, it provides such pieces of information for each of the detected objects. The processor 2 regularly provides such information to the primary controller 5.

Figure 8:
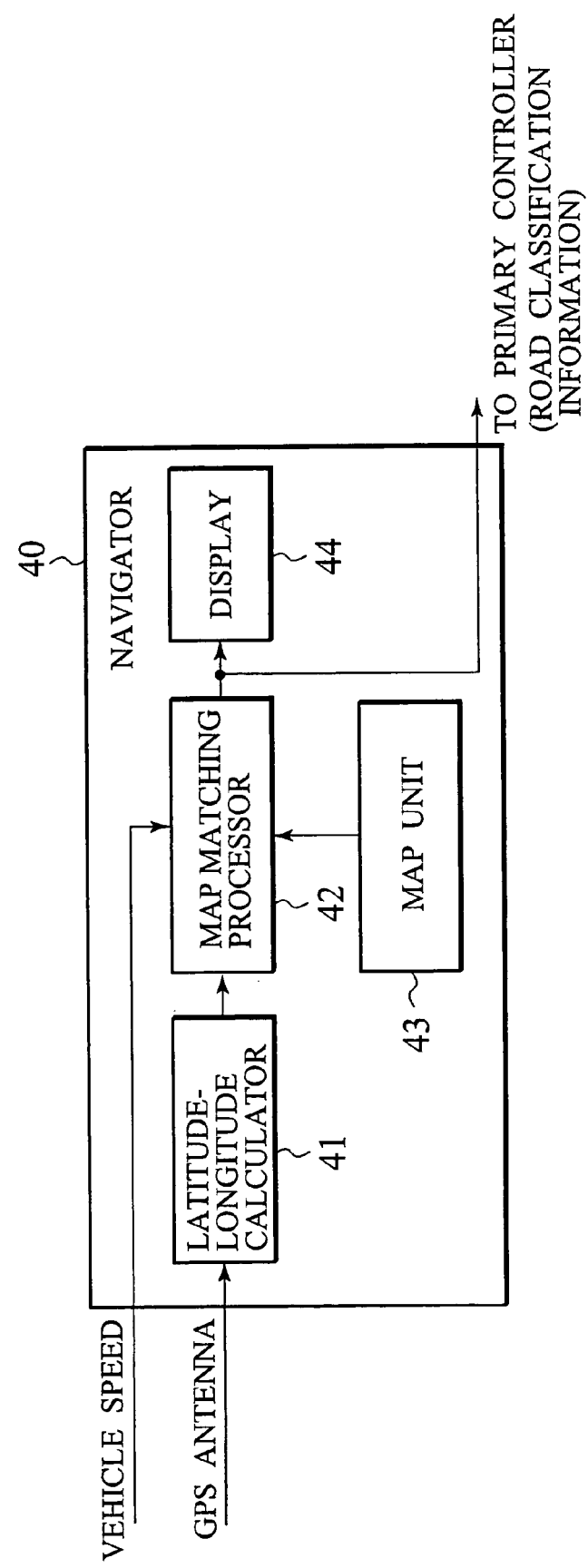
FIG. 8 is a block diagram showing a navigator in the drive control system.

FIG. 8 shows an exemplary structure of the navigator 40. The navigator 40 has a latitude-longitude calculator 41, a map matching processor 42, a map unit 43, and a display 44. The latitude-longitude calculator 41 refers to satellite position and time information sent from a GPS (Global Positioning System) antenna and calculates the latitude and longitude of the own vehicle. The map unit 43 stores digital map information. The digital map in the map unit is linked with a database storing road classifications. The map matching processor 42 refers to the latitude and longitude information provided by the latitude-longitude calculator 41 and the map information in the map unit 43 and specifies the position of the own vehicle on the map. The display 44 displays the map and the position of the own vehicle on the map according to the information specified by the map matching processor 42.

According to the road determined by the map matching processor 42 as a road on which the own vehicle is running, the navigator 40 transmits road classification information read from the database to the primary controller 5.

The primary controller 5 is configured to conduct various control operations for the vehicle. The following explanation will be made only on functions of the primary controller 5 concerning the present invention. The primary controller 5 receives vehicle speed information from the vehicle speed sensor 1, detection results from the object detecting processor 2, accelerator-pedal stroke information from the accelerator pedal 4, road classification information from the navigator 40, and the like. According to these pieces of information, the primary controller 5 generates command signals and supplies the command signals to the driving force controller 10 and braking force controller 20, respectively.

Processes carried out by the primary controller 5 will be explained with reference to FIG. 9. The primary controller 5 executes the steps of FIG. 9 as subroutines that are regularly called in response to timer interrupts. In step S1, the primary controller 5 fetches vehicle speed data and steering angle data from the vehicle speed sensor 1 and a steering angle sensor (not shown). The vehicle speed sensor 1 and steering angle sensor are each an encoder that provides pulses at predetermined intervals in response to the rotation thereof The primary controller 5 counts the number of pulses from each of the sensors and accumulates the counts to provide a steering angle δ (rad) and a vehicle speed Vh (m/s). These results are stored in a memory (not shown) of the primary controller 5.

In step S2, the primary controller 5 fetches road classification information from the navigator 40. The road classification information is information indicating, for example, an "Expressway" or an "Open road." The primary controller 5 receives such a classification from the navigator 40 as a classification code. In step S3, the primary controller 5 fetches object information. Namely, the primary controller 5 fetches detected results provided by the object detecting processor 2, including a front-rear direction X (m), a left-right direction Y (m), an object width W (m), and a relative speed ΔV (m/s). The primary controller 5 employs a standard communication technique such as a serial communication technique to communicate information with the object detecting processor 2. The primary controller 5 stores the fetched information in the memory.

In step S4, the primary controller 5 carries out a course prediction process according to the fetched vehicle speed Vh and steering angle δ. A turning curvature ρ (1/m) is expressed with the vehicle speed Vh and steering angle δ as in the following expression (1):

$$\rho = 1/\{(1+A \cdot Vh^2)L\} \cdot (\delta/N) \tag{1}$$

where L is a wheel base of the vehicle, A is a stability factor which is a positive constant to be determined according to the vehicle, and N is a steering gear ratio.

A turning radius R is expressed with the use of the turning curvature ρ as follows:

$$R = 1/\rho \tag{2}$$

Figure 10:
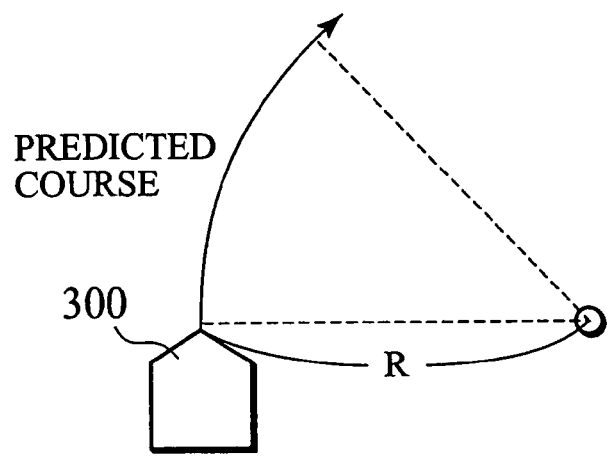
FIG. 10 explains a course prediction carried out by the drive control system.

The turning radius R can be used as shown in FIG. 10 to predict a course of the vehicle as a circular arc having the radius R centered at a point perpendicularly (rightward in FIG. 10) distanced from the vehicle 300 by the radius R.

In the following explanation, the steering angle δ takes a positive value for rightward steering and a negative value for leftward steering. In connection with the turning curvature and turning radius, it is defined that a positive steering angle δ corresponds to a right turn and a negative steering angle δ corresponds to a left turn.

Figure 11:
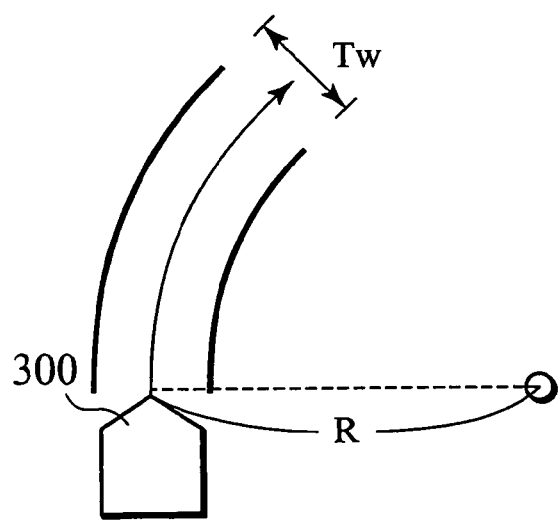
FIG. 11 explains a course prediction conducted in consideration of the width of a vehicle.

Thereafter, the predicted course is converted into one having a vehicle width or a lane width. The predicted course is only a locus predicting a course of the vehicle, and therefore, it is necessary to determine a vehicle driving zone having the vehicle width or lane width. FIG. 11 shows a predicted course zone obtained by considering the vehicle width or lane width. The predicted course zone shown in FIG. 11 is obtained by adding the width Tw of the vehicle 300 to the predicted course. The predicted course zone of the vehicle is defined by a circular arc with a radius of "R−Tw/2" and a circular arc with a radius of "R+Tw/2" depicted around the same center as that for the predicted course.

Instead of the steering angle δ, a yaw rate γ may be employed with the vehicle speed Vh to express the course of the vehicle as in the following expression (3):

$$R = Vh/\gamma \tag{3}$$

Alternatively, a course of the vehicle may be predicted with the use of a lateral acceleration Yg and the vehicle speed Vh as in the following expression (4):

$$R = Vh^2/Yg \tag{4}$$

The following explanation is based on the course of the vehicle predicted according to the vehicle speed Vh and steering angle δ as mentioned first.

In step S5, the primary controller 5 determines, in step S5, whether the object (obstacle) is in the predicted course according to the information about the object fetched in step S2. If the object is in the predicted course, step S6 and steps that follow carry out a contact possibility determining process for the object. This process excludes any object that is out of the predicted course zone from consideration of contact possibility even if the object is located very close to the vehicle.

In step S6, the primary controller 5 determines a contact possibility by calculating an absolute collision time (first collision time) THW by dividing the distance X between vehicles (an object-to-object distance) and the object by the own vehicle speed Vh according to the following expression (5), as well as calculating a relative collision time (second collision time) TTC by dividing the distance X by the relative speed Vr (or ΔV) according to the following expression (6).

$$THW = X/Vh \tag{5}$$

$$TTC = X/Vr \tag{6}$$

If step S5 determines that there are a plurality of objects in the predicted course, the absolute collision time THW and relative collision time TTC are calculated for each of the objects.

Figure 12:
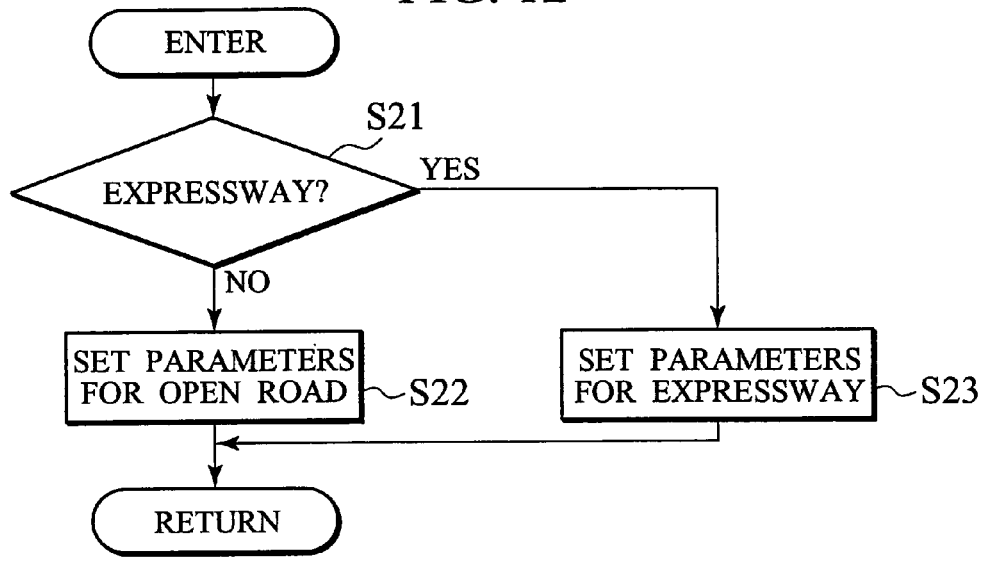
FIG. 12 is a flowchart showing a parameter setting process of the flowchart of FIG. 9.

In step S7, the primary controller 5 selects an object (obstacle) having a minimum absolute collision time THW and an object (obstacle) having a minimum relative collision time TTC. In step S8, the primary controller 5 carries out a parameter setting process. FIG. 12 shows this parameter setting process.

In step S21, the primary controller 5 refers to the road classification information fetched in the road classification information fetching process of step S2 and determines whether the own vehicle is running on an express way. If the own vehicle is running on an express way, the primary controller 5 proceeds to step S23, and if it is running on an open road, to step S22.

In step S23, the primary controller 5 sets parameters for an express way. The parameters to be set include a threshold (hereinafter referred to as the absolute collision time threshold) THW_Th to be compared with the absolute collision time THW, a control gain (hereinafter referred to as the absolute collision time control gain) k_THW for the absolute collision time THW, a control gain (hereinafter referred to as the relative collision time control gain) k_TTC for the relative collision time TTC, and a threshold (hereinafter referred to as the relative collision time threshold) TTC_Th to be compared with the relative collision time TTC.

Figure 13:
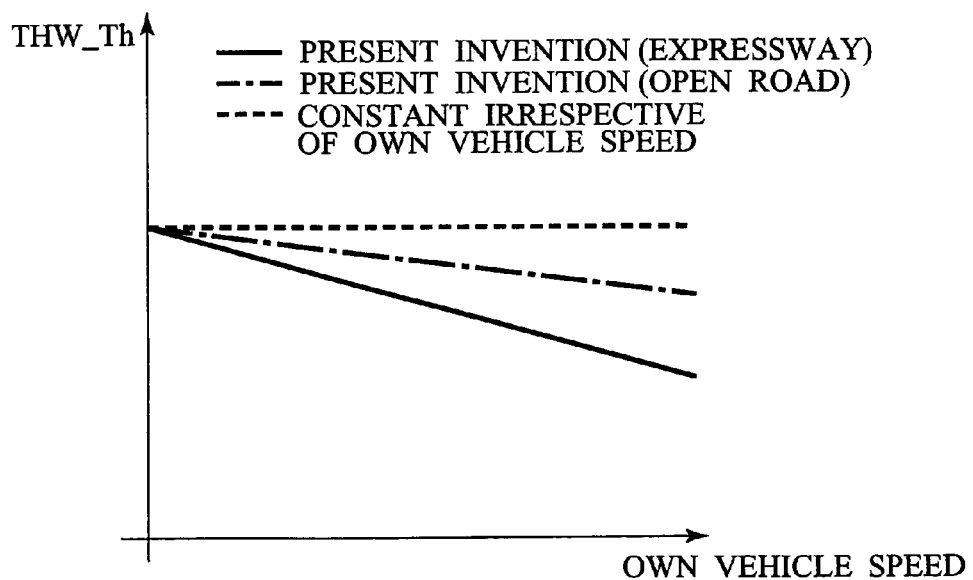
FIG. 13 explains the setting of an absolute collision time threshold THW_Th in the parameter setting step of FIG. 12.

As indicated with a continuous line in FIG. 13, the absolute collision time threshold THW_Th is set to become smaller as the own vehicle speed Vh fetched in step S1 becomes larger. The absolute collision time control gain k_THW is set to become smaller as the own vehicle speed Vh becomes larger as indicated with a continuous line in FIG. 14. The relative collision time threshold TTC_Th is set to become larger as the own vehicle speed Vh become larger as indicated with a continuous line shown in FIG. 15. The relative collision time control gain k_TTC is set to become larger as the own vehicle speed Vh become larger as indicated with a continuous line shown in FIG. 16. The primary controller 5 sets the parameters in this way and completes the process of FIG. 12.

In FIGS. 13 to 16, dotted lines indicate thresholds that are constant irrespective of the own vehicle speed Vh. In step S22, the primary controller 5 sets parameters for an open road. These parameters are the same as those set in step S23 in terms of type. They, however, are assigned to different values that are all greater than those for the expressway.

Namely, the absolute collision time threshold THW_Th for the open road is set to become smaller as the own vehicle speed Vh fetched in step S1 becomes larger and to have larger values than those for the expressway as indicated with a dot-and-ash line in FIG. 13. The absolute collision time control gain k_THW for the open road is set to become smaller as the own vehicle speed Vh becomes larger and to have larger values than those for the expressway as indicated with a dot-and-dash line in FIG. 14. The relative collision time threshold TTC_Th for the open road is set to become larger as the own vehicle speed Vh becomes larger and to have larger values than those for the expressway as indicated with a dot-and-dash line in FIG. 15. The relative collision time control gain k_TTC for the open road is set to become larger as the own vehicle speed Vh becomes larger and to have larger values than those for the expressway as indicated with a dot-and-dash line in FIG. 16. The primary controller 5 sets the parameters in this way and completes the process of FIG. 12.

Figure 15:
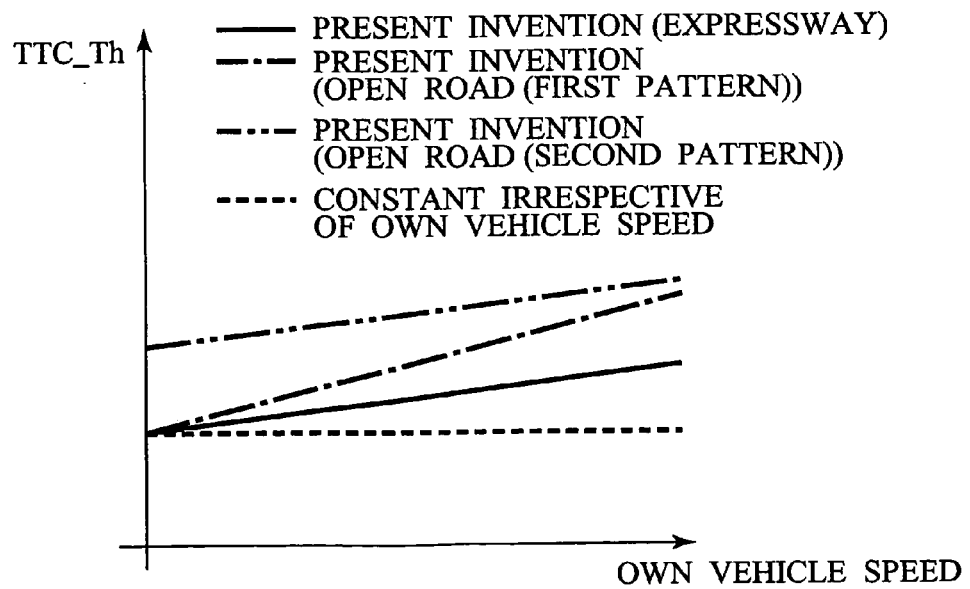
FIG. 15 explains the setting of a relative collision time threshold TTC_Th in the parameter setting step of FIG. 12.

The relative collision time threshold TTC_Th for an open road may be set as indicated with a two-dots-and-ash line in FIG. 15. Namely, it may be set to change like that for the expressway according to the own vehicle speed Vh and to have larger values than those for the expressway. Also, the relative collision time control gain k_TTC for an open road may be set as indicated with a two-dots-and-dash line in FIG. 16. Namely, it may be set to change like that for the expressway according to the own vehicle speed Vh and to have larger values than those for the expressway.

The functions of these parameters including the absolute collision time threshold THW_Th, absolute collision time control gain k_THW, relative collision time threshold TTC_Th, and relative collision time control gain k_TTC will be explained later in detail. In this way, the primary controller 5 carries out the parameter setting process in step S8.

Figure 9:
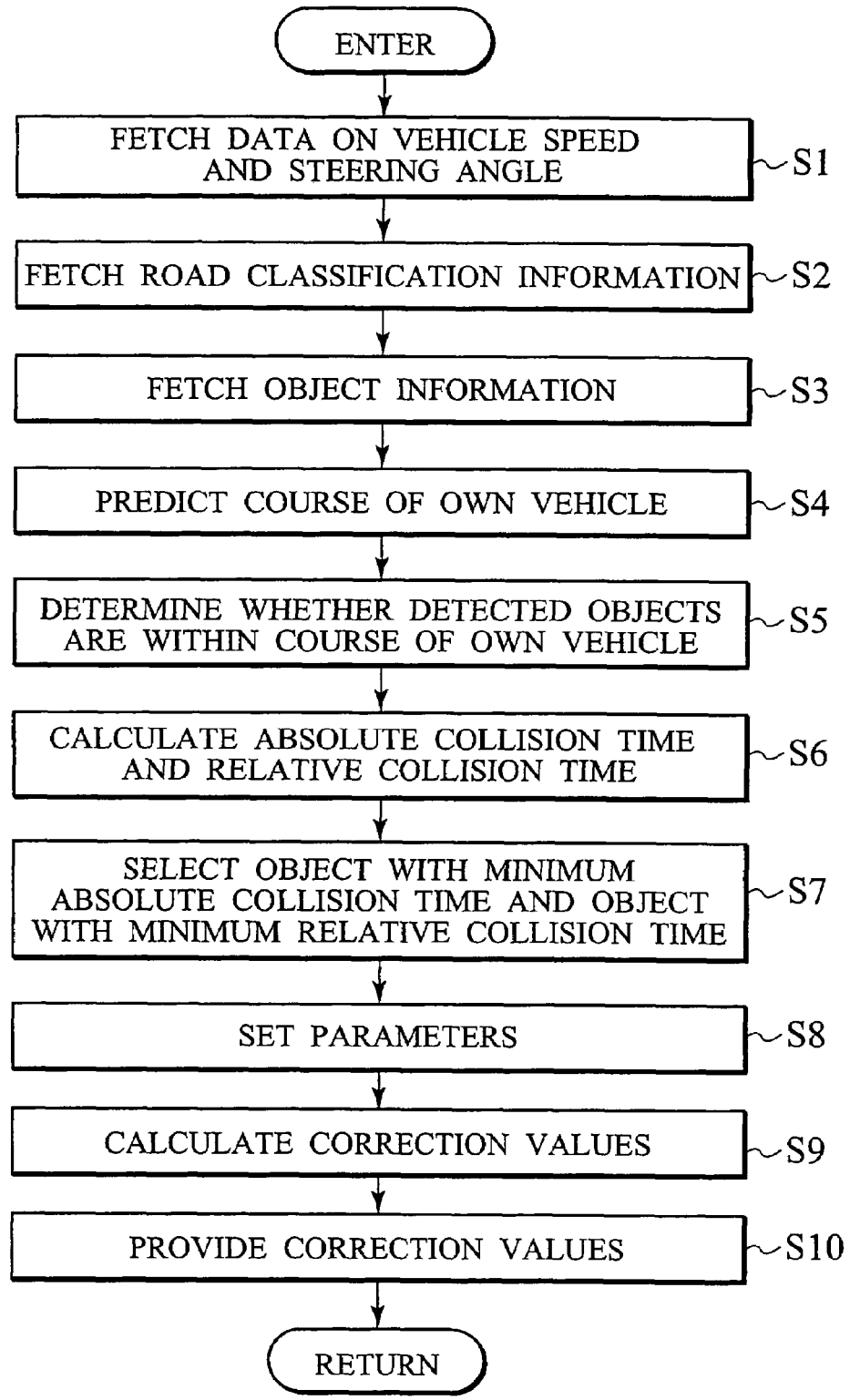
FIG. 9 is a flowchart showing steps carried out by a primary controller in the drive control system.

Thereafter, in step S9 of FIG. 9, the primary controller 5 compares the absolute collision time THW of the object having the minimum absolute collision time THW with the absolute collision time threshold THW_Th set in step S8 and calculates a correction value. Also, the primary controller 5 compares the relative collision time TTC of the object having the minimum relative collision time TTC with the threshold value TTC_Th and calculates a correction value.

Figure 17A:
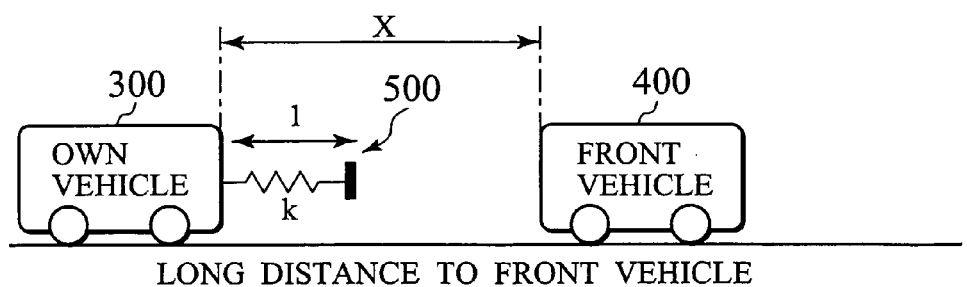
FIG. 17A is a model showing a vehicle with a virtual spring to calculate a correction value, and FIG. 17B showing a model of FIG. 17A in case that the front vehicle is in range of the length of the virtual spring from own vehicle.

Basics on which the correction values are calculated will be explained. As shown in FIG. 17A, a virtual spring as an elastic body 500 having an elastic coefficient k is assumed between the own vehicle 300 and a front vehicle (preceding vehicle) 400 that is an object present in front of the own vehicle 300. In this model, the own vehicle 300 is separated from the front vehicle 400 by a distance X. If this distance X becomes shorter than a distance l, the virtual spring 500 comes in contact with the front vehicle 400 and is compressed. This compression force acts as counter force or repulsive force of the virtual spring 500. This counter force serves as virtual driving resistance against the own vehicle 300. This virtual driving resistance f is expressed as f=k (1–X).

In more detail, the length L_THW (or l) of the virtual spring 500 in the model can be related to the own vehicle speed Vh and the absolute collision time threshold THW_Th and is expressed as follows:

$$L\_THW = THW\_Th \cdot Vh \tag{7}$$

Figure 17B:
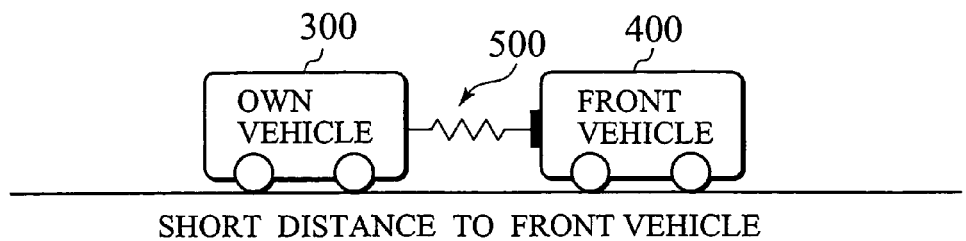

The elastic coefficient or the absolute collision time control gain of the virtual spring 500 of the length L_THW is k_THW (or k) that is assumed to vary in response to the front-rear distance (elastic displacement) X when the front vehicle 400 comes within the range of the length L_THW of the virtual spring 500 from the own vehicle 300 as shown in FIG. 17B. At this time, the virtual spring 500 generates a first counter force F_THW as follows:

$$F\_THW = k\_THW(L\_THW - X) \tag{8}$$

According to this model, the virtual spring 500 having the elastic coefficient k_THW generates the first counter force F_THW when the distance X between the own vehicle 300 and the front vehicle 400 is shorter than the basic length L_THW. The elastic coefficient k_THW is the above-mentioned control gain and is a control parameter to be adjusted to provide a proper warning effect.

As is apparent from the above explanation, the virtual spring 500 will not be compressed in case that a object-to-object distance (a distance between objects) X is greater than the basic length L_THW (X>L_THW). Namely, if X>L_THW, then F_THW is zero. On the other hand, in case that the object-to-object distance X is shorter than L_THW, the first counter force F_THW of the virtual spring 500 serving as a correction value can be calculated from the expression (8) according to the front-rear distance X.

Figure 18:
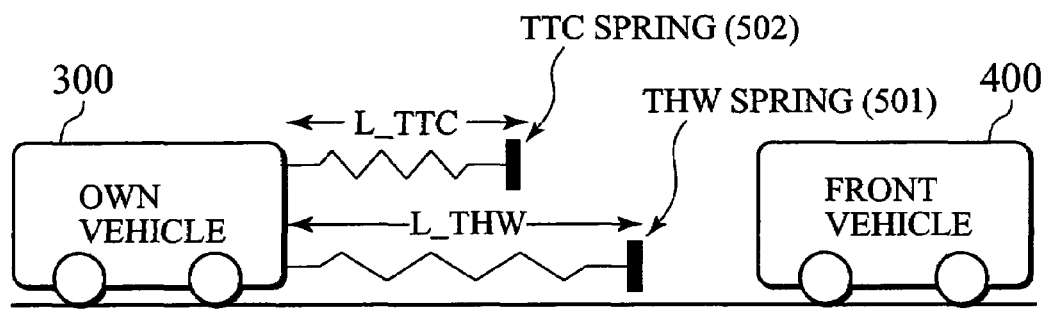
FIG. 18 is a model showing a vehicle with virtual springs representative of absolute collision time and relative collision time.

In the above-mentioned model, the length L_THW of the virtual spring (hereinafter referred to as the first virtual spring) 500 is obtained in connection with the own vehicle speed Vh and absolute collision time threshold THW_Th. Also assumed is a model involving a virtual elastic body or spring (hereinafter referred to as the second virtual spring) having a length of L_TTC and related to the relative collision time threshold TTC_Th. FIG. 18 shows the second virtual spring 502 as well as the first virtual spring 501.

In connection with the second virtual spring 502, the length L_TTC thereof can be related to the relative speed Vr and relative collision time threshold TTC_Th as follows:

$$L\_TTC = TTC\_Th \cdot Vr \quad (9)$$

The second virtual spring 502 having the length L_TTC (or l) is assumed to have an elastic coefficient k (the relative collision time control gain k_TTC mentioned above). Like the case shown in FIG. 17B, the length L_TTC changes in response to the front-rear distance (elastic deformation) X when the front vehicle 400 is positioned within the length L_TTC of the second virtual spring 502 from the own vehicle 300. In this case, the second virtual spring 502 generates a second counter force F_TTC as follows:

$$F\_TTC = k\_TTC \cdot (L\_TTC - X) \quad (10)$$

According to this model, the second virtual spring 502 of the elastic coefficient k_TTC generates the second counter force F_TTC in case that the distance X between the own vehicle 300 and the front vehicle 400 is shorter than the basic length L_TTC. The elastic coefficient k_TTC is the above-mentioned control gain and is a control parameter to be adjusted to provide a proper warning effect.

The second virtual spring 502 will not be compressed if the relative speed Vr is small and if the object-to-object distance X is long (X>L_TTC). In this case, the second counter force F_TTC will not be generated (F_TTC=0). On the other hand, if the relative speed Vr is large and if the object-to-object distance X is short (L_TTC>X), the second virtual spring 502 generates the second counter force F_TTC as a correction value which can be calculated from the expression (10) according to the front-rear distance X.

With these models, the first counter force F_THW is calculated according to the first virtual spring 501 of the length L_THW and the second counter force F_TTC is calculated according to the second virtual spring 502 of the length L_TTC. Of the calculated first and second counter forces F_THW and F_TTC, a larger one is selected as a final correction value Fc.

Figure 19:
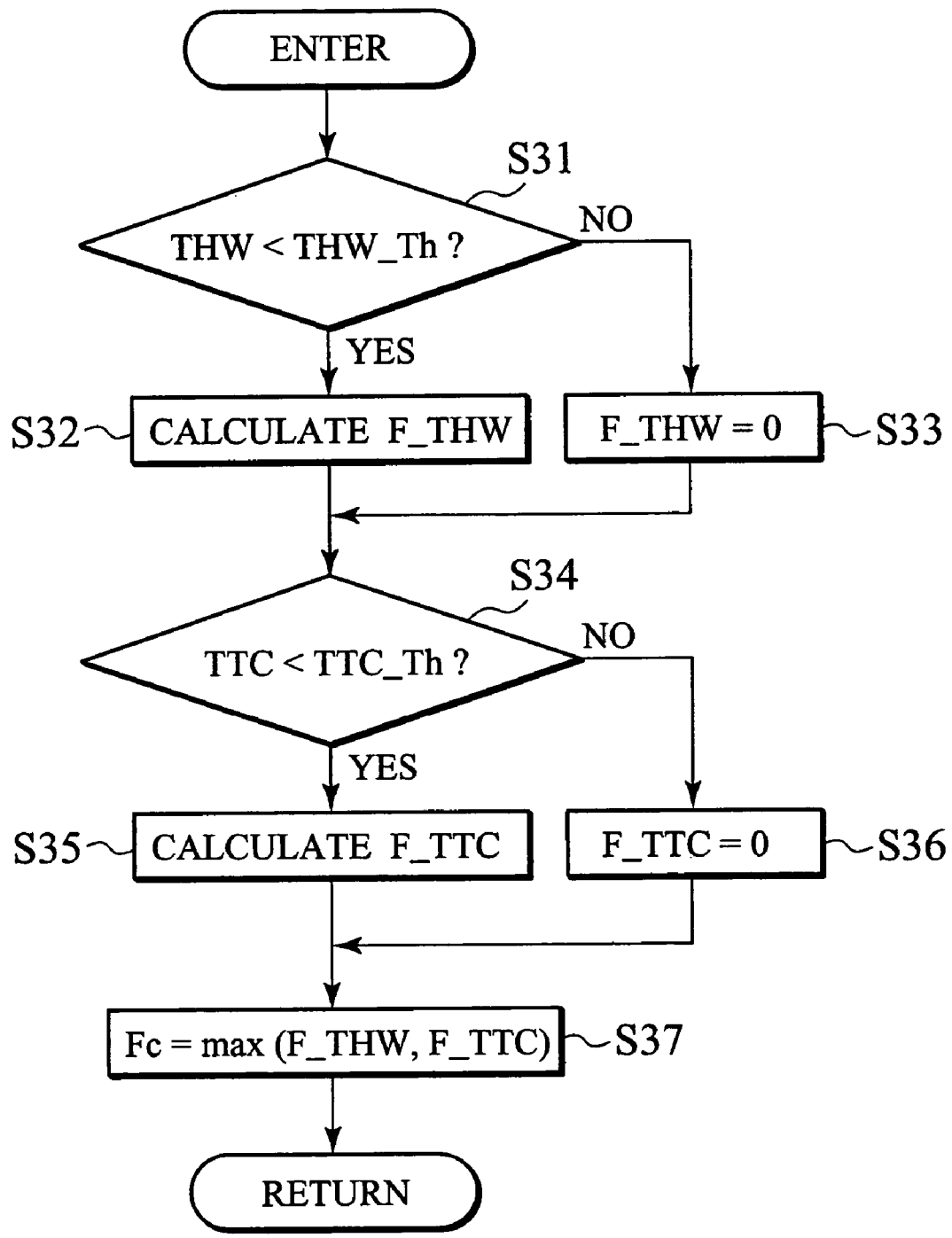
FIG. 19 is a flowchart showing a correction value calculating process of the flowchart of FIG. 9.

FIG. 19 shows a process of calculating such a correction value. This process is based on the idea mentioned above and provides the final correction value Fc according to a relationship between the absolute collision time THW and the absolute collision time threshold THW_Th and a relationship between the relative collision time TTC and the relative collision time threshold TTC_Th.

In step S31, the primary controller 5 determines whether the absolute collision time THW is below the absolute collision time threshold THW_Th. If the absolute collision time THW is below the absolute collision time threshold THW_Th, step S32 is carried out, and if the absolute collision time THW is equal to or greater than the absolute collision time threshold THW_Th, step S33 is carried out.

In step S32, the primary controller 5 calculates the first counter force F_THW from the expression (8) according to the front-rear distance X, and step S34 is carried out On the other hand, in step S33, the primary controller 5 sets the first counter force F_THW to zero, and step S34 is carried out. In step S34, the primary controller 5 determines whether the relative collision time TTC is below the relative collision time threshold TTC_Th. If the relative collision time TTC is below the relative collision time threshold TTC_Th, step S35 is carried out, and if the relative collision time TTC is equal to or above the relative collision time threshold TTC_Th, step S36 is carried out. In step S35, the primary controller 5 calculates the second counter force F_TTC from the expression (10) according to the front-rear distance X and advances to step S37. On the other hand, in step S36, the primary controller 5 sets the second counter force F_TTC to zero and advances to step S37.

In step S37, the primary controller 5 determines a larger one of the calculated first and second counter forces F_THW and F_TTC as the final correction value Fc.

Figure 20:
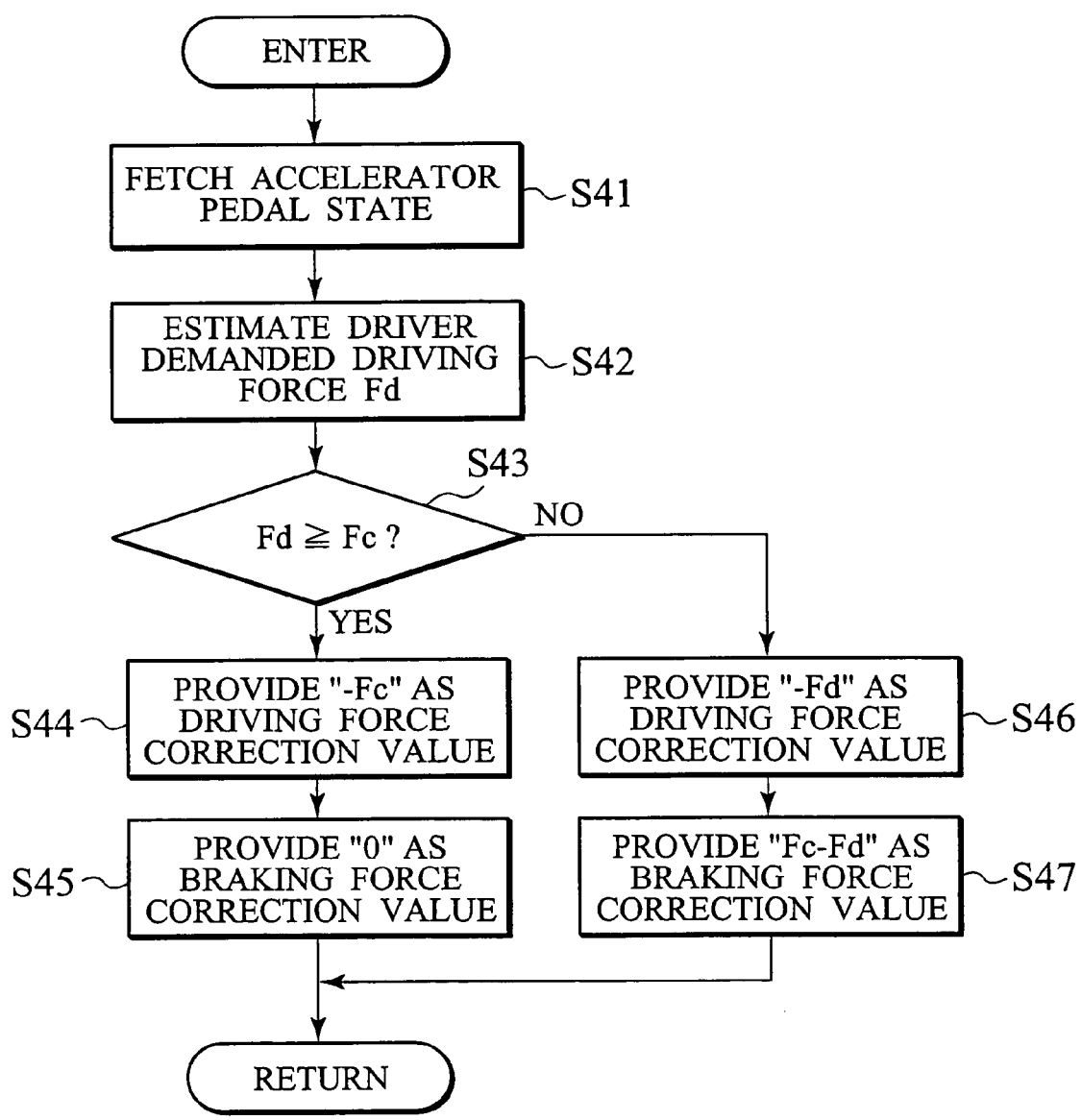
FIG. 20 is a flowchart showing a correction value providing process of the flowchart of FIG. 9.

In this way, the primary controller 5 calculates the correction value Fc in step S9. Then, in step S10, the primary controller 5 provides the calculated correction value Fc to the driving force controller 10 and braking force controller 20. FIG. 20 shows the correction value providing process.

In step S41, the primary controller 5 obtains an accelerator-pedal stroke from information fetched in advance. In step S42, the primary controller 5 estimates a driver demanded driving force Fd according to the accelerator-pedal stroke. More precisely, the primary controller 5 uses a map equivalent to the driver demanded driving force calculating map (FIG. 3) used by the driving force controller 10 and estimates the driver demanded driving force Fd corresponding to the accelerator-pedal stroke. In step S43, the primary controller 5 compares the estimated driver demanded driving force Fd with the correction value Fc and provides a comparison result Namely, the primary controller 5 determines whether the driver demanded driving force Fd is equal to or greater than the correction value Fc. If the driver demanded driving force Fd is equal to or greater than the correction value Fc (Fd≧Fc), step S44 is carried out, and if the driver demanded driving force Fd is below the correction value Fc (Fd<Fc), step S46 is carried out.

In step S44, the primary controller 5 provides the correction value Fc as a driving force correction value (−Fc) to the driving force controller 10, and in step S45, provides zero as a braking force correction value to the braking force controller 20. On the other hand, the primary controller 5 provides, in step S46, a negative value (−Fd) of the driver demanded driving force Fd as a driving force correction value to the driving force controller 10, and in step S47, provides a difference (Fc−Fd) between the correction value Fc and the driver demanded driving force Fd as a braking force correction value to the braking force controller 20.

Through this correction value providing process conducted by the primary controller 5, the driving force controller 10 receives the sum of the driving force correction value and the driver demanded driving force from the primary controller 5 as a target driving force. At the same time, the braking force controller 20 receives, as a target braking force, the sum of the braking force correction value and a driver demanded braking force from the primary controller 5. This realizes the control of the driving force and braking force of the vehicle according to the correction value Fc.

In the drive control system with this configuration, the driving force controller 10 controls the engine 6 to generate a driving force corresponding to a stroke of the accelerator pedal 4, and the braking force controller 20 controls the brake to generate a braking force corresponding to a stroke of the brake pedal 3.

At this time, the drive control system corrects the engine and brake control values corresponding to the accelerator-pedal and brake-pedal strokes according to whether there is a possibility of the vehicle contacting with an object. Namely, the drive control system receives information about an object in front of the own vehicle from the object detecting processor 2 connected to the radar 30, own vehicle speed information from the vehicle speed sensor 1, and steering angle information from the steering angle sensor; identifies any object having a contact possibility according to the received information; finds a correction value Fc with the use of the correction value obtaining models of FIGS. 17 and 18; calculates a driving force correction value and a braking force correction value according to the correction value Fc; and provides a target driving force and a target braking force corrected by the driving force correction value and braking force correction value to control the engine 6 and brake.

An operation of the drive control system according to an embodiment of the present invention will be explained. The drive control system predicts a course of the own vehicle (step S4). If there are objects (obstacles) in the predicted course, the system identifies objects for which contact possibilities are examined (steps S5 to S7). More precisely, the system calculates an absolute collision time THW and a relative collision time TTC for each object in the predicted course. If there is a plurality of such objects, the absolute collision time THW and relative collision time TTC are calculated for each of the objects (steps S5 and S6). According to the absolute collision times THW and relative collision times TTC, the system identifies an object having a minimum absolute collision time THW and an object having a minimum relative collision time TTC (step S7).

Then, the drive control system employs the absolute collision time (first collision time) THW and absolute collision time threshold THW_Th of the object having the minimum absolute collision time THW and finds a first counter force F_THW serving as a correction value. Further, the system employs the relative collision time (second collision time) TTC and relative collision time threshold TTC_Th of the object having the minimum relative collision time TTC and finds a second counter force F_TTC serving as a correction value (step S9).

More precisely, if the absolute collision time THW is equal to or greater than the absolute collision time threshold THW_Th, i.e., if the absolute collision time is long (the object-to-object distance is longer than the distance L_THW), the first counter force F_THW is set to zero (step S33). On the other hand, if the absolute collision time THW is below the absolute collision time threshold THW_Th, i.e., if the absolute collision time is short (the object-to-object distance reaches the distance L_THW), the expression (8) is used to calculate the first counter force F_THW corresponding to the object-to-object distance at the moment according to the absolute collision time threshold THW_Th and absolute collision time control gain k_THW (step S32). As a result, when the object-to-object distance becomes smaller than a first threshold related to the absolute collision time threshold THW_Th in the expression (7), the first counter force F_THW (negative acceleration) becomes stronger as the object-to-object distance becomes smaller.

If the relative collision time TTC is equal to or greater than the relative collision time threshold TTC_Th, i.e., if the relative collision time is long (the object-to-object distance is longer than the distance L_TTC), the second counter force F_TTC is set to 0 (step S36). On the other hand, if the relative collision time TTC is below the relative collision time threshold TTC_Th, i.e., if the relative collision time is short (the object-to-object distance reaches the distance L_TTC), the expression (10) is employed with the relative collision time threshold TTC_Th and relative collision time control gain k_TTC, to calculate the second counter force F_TTC corresponding to the object-to-object distance at the moment (step S35). As a result, when the object-to-object distance becomes smaller than a second threshold related to the relative collision time threshold TTC_Th in the expression (9), the second counter force F_TTC (negative acceleration) becomes stronger as the object-to-object distance becomes shorter.

Thereafter, the drive control system chooses a larger one of the first and second counter forces F_THW and F_TTC as a final correction value Fc (step S37). The correction value Fc is added as a counter acceleration (negative acceleration) against the advancing direction of the own vehicle to provide a contact possibility warning for the driver.

The drive control system determines a target driving force according to the final correction value Fc and drives the engine 6 accordingly (step S10). Namely, if the accelerator pedal 4 is pressed and a driver demanded driving force Fd corresponding to the accelerator-pedal stroke is equal to or greater than a correction value Fc, the drive control system provides a negative value –Fc of the correction value Fc as a driving force correction value to the driving force controller 10 and a braking force correction value of 0 to the braking force controller 20 (steps S44 and S45).

Consequently, the driving force controller 10 receives the sum of the driver demanded driving force and the negative value –Fc as a target driving force and drives the engine 6 to generate the target driving force. As a result, an actual driving force is less than the driver demanded driving force by Fc, and therefore, the vehicle shows acceleration behavior that is dull relative to the stroke of the accelerator pedal 4 pressed by the driver. The driver, therefore, senses an acceleration feeling less than expected by pressing the accelerator pedal 4 and is warned by the dull acceleration behavior of a contact possibility that the own vehicle is approaching the front vehicle.

On the other hand, if the estimated driver demanded driving force Fd corresponding to the accelerator-pedal stroke is below the correction value Fc, the drive control system provides a negative value –Fd of the estimated driver demanded driving force Fd as a driving force correction value to the driving force controller 10, as well as the difference (Fc–Fd) between the correction value Fc and the estimated driver demanded driving force Fd as a braking force correction value to the braking force controller 20 (steps S46 and S47).

As a result, the driving force controller 10 receives the sum of the driver demanded driving force and the negative value −Fd as a target driving force and drives the engine 6 so as to generate the target driving force. On the other hand, the braking force controller 20 receives the sum of a driver demanded braking force and the difference (Fc−Fd) as a target braking force and controls the brake so as to generate the target braking force. As a result, the actual driving force becomes substantially zero with respect to the driver demanded driving force. In addition, an actual braking force becomes larger than the driver demanded braking force by the difference (Fc−Fd). Namely, if the driver demanded driving force Fd is below the correction value Fc (Fd<Fc), control by the driving force controller 10 is insufficient to provide the target counter force (correction value Fc). Therefore, the negative driving force correction value −Fd of the driver demanded driving force Fd is supplied to the driving force controller 10, and at the same time, the difference (Fc−Fd) supplementing the shortage is supplied to the braking force controller 20 to realize the counter force (correction value Fc). Namely, excess and shortage in the driving force controller 10 and braking force controller 20 are adjusted and the controllers 10 and 20 are operated in cooperation with each other, to provide the required counter force (Fc) as a whole. This required counter force is applied as driving resistance to the own vehicle. If an accelerator-pedal stroke is below a correction value (Fc), a driver demanded braking force is increased by the shortage (Fc−Fd), and the vehicle shows a deceleration behavior due to the increased braking force. This deceleration behavior is a contact possibility warning with which the driver recognizes that the own vehicle is approaching the front vehicle.

As mentioned above, if a driver demanded driving force Fd corresponding to an accelerator-pedal stroke is equal to or greater than a correction value Fc (Fd≧Fc), then Fd−Fc≧0, and therefore, a positive driving force is left after correcting (by subtraction) the driver demanded driving force Fd by the correction value Fc. Therefore, if a driver demanded driving force Fd corresponding to an accelerator-pedal stroke is greater than a correction value Fc, a braking force correction value is zeroed, and without relying on the braking force controller 20, the correction value Fc is given as a negative driving force correction value to the driving force controller 10 so that correction is made only by the driving force controller 10 to generate the whole of the required counter force. This counter force is applied as driving resistance to the vehicle.

As explained above, the correction value Fc representative of the size of deceleration is chosen from a larger one of the first counter force F_THW based on the absolute collision time THW and the second counter force F_TTC based on the relative collision time TTC. According to this technique, if there is a possibility of the own vehicle contacting a front vehicle due to the absolute collision time (i.e., the object-to-object distance), the first counter force F_THW becomes larger than the second counter force F_TTC, and therefore, the first counter force F_THW is used as a correction value Fc to provide deceleration control as a contact possibility warning. On the other hand, if there is a possibility of contacting the front vehicle due to the relative collision time (i.e., the relative speed), the second counter force F_TTC becomes larger than the first counter force T_THW, and therefore, the second counter force F_TTC is used as a correction value Fc to provide deceleration control as a contact possibility warning. In this way, if there is a possibility of the own vehicle contacting a front vehicle due to any one of the absolute and relative collision times, a contact possibility warning is provided and a counter force corresponding to the absolute or relative collision time that caused the warning is activated. In this way, the absolute and relative collision times are both used to determine a possibility of the own vehicle contacting a front vehicle and provide a contact possibility warning accordingly.

Figure 21:
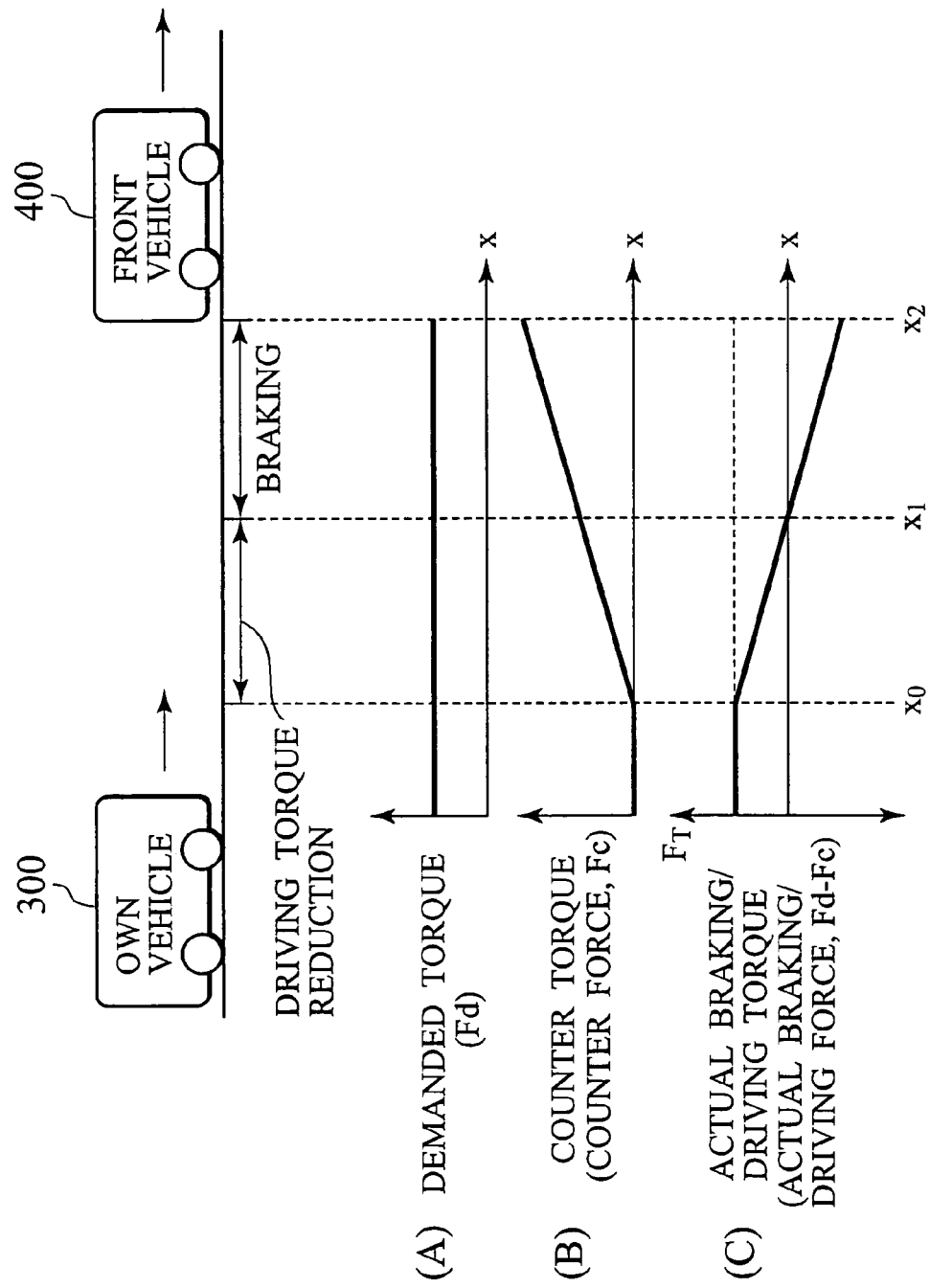
FIG. 21 shows relationships among counter force, demanded torque, and actual driving/braking force.

FIG. 21 shows the behavior of the own vehicle based on the correction value (counter force) Fc and driver demanded driving force (demanded torque) Fd. In this example, the accelerator-pedal stroke is kept at a constant value. An abscissa (x-axis) is fixed to the front vehicle 400 and indicates the relative position of the own vehicle 300. A position where the own vehicle 300 contacts with the front vehicle 400 is expressed as $x=x_2$. The correction value (counter force) Fc is one of the first counter force F_THW and second counter force F_TTC.

When the own vehicle 300 approaches the front vehicle 400 to reduce a object-to-object distance to a predetermined value ($x=x_0$), the correction value (counter force) Fc is generated as shown in FIG. 21(B). As the object-to-object distance ($L(x)=x_2-x$) becomes shorter, the correction value (counter force) Fc is controlled to increase. Since the accelerator-pedal stroke is constant, the driver demanded driving force Fd is constant irrespective of the object-to-object distance as shown in FIG. 21(A).

As a result, as shown in FIG. 21(C), the difference FT between the driver demanded driving force Fd and the correction value (counter force) Fc expressed as FT= (Fd−Fc) works as an actual braking/driving force. The difference FT is a generalized driving force, i.e., a net driving force where a braking force is a negative driving force. The net driving force FT is equal to the driver demanded driving force Fd to a certain object-to-object distance ($x=x_0$). If the distance becomes shorter than this ($x_0<x\leq x_2$), the net driving force FT is controlled to decrease. When the distance becomes further shorter ($x_1\leq x$) to make the correction value Fc exceed the demanded driving force Fd, the net driving force FT takes a negative value to carry out correction control on a braking force. In a region ($x_0\leq x\leq x_2$) where the net driving force FT decreases as the own vehicle 300 approaches the front vehicle 400 and where ($x_0\leq x\leq x_1$) the net driving force FT takes a positive value, a driving force control value for the driving force controller 10 is corrected to reduce driving torque (steps S44 and S45). In a region where the net driving force FT decreases and where ($x_1\leq x\leq x_2$) the net driving force FT takes a negative value, a braking force control value for the braking force controller 20 is corrected to increase a braking force (steps S46 and S47).

According to the virtual spring models, the control of the net driving force FT by the correction value Fc is achieved in a predetermined distance range ($x_0\leq x\leq x_2$), and the size of the net driving force FT is changed according to an object-to-object distance. According to the control model of the present invention, the object-to-object-distance upper limit ($x_0$) can be changed to change the start timing of the correction control operation. In addition, correspondence between the object-to-object distance and the net driving force FT can be changed to change the size of the net driving force FT corresponding to the object-to-object distance. For example, decreasing the object-to-object distance upper limit, i.e., increasing $x_0$ may delay the timing of the correction control operation. For example, by changing correspondence between the object-to-object distance and the net driving force FT according to the own vehicle speed as indicated with a continuous line in FIG. 14, the size of the net driving force FT may become smaller as the own vehicle speed becomes higher with respect to the same object-to-object distance ($X_0 \leq x \leq x_2$).

Figure 22:
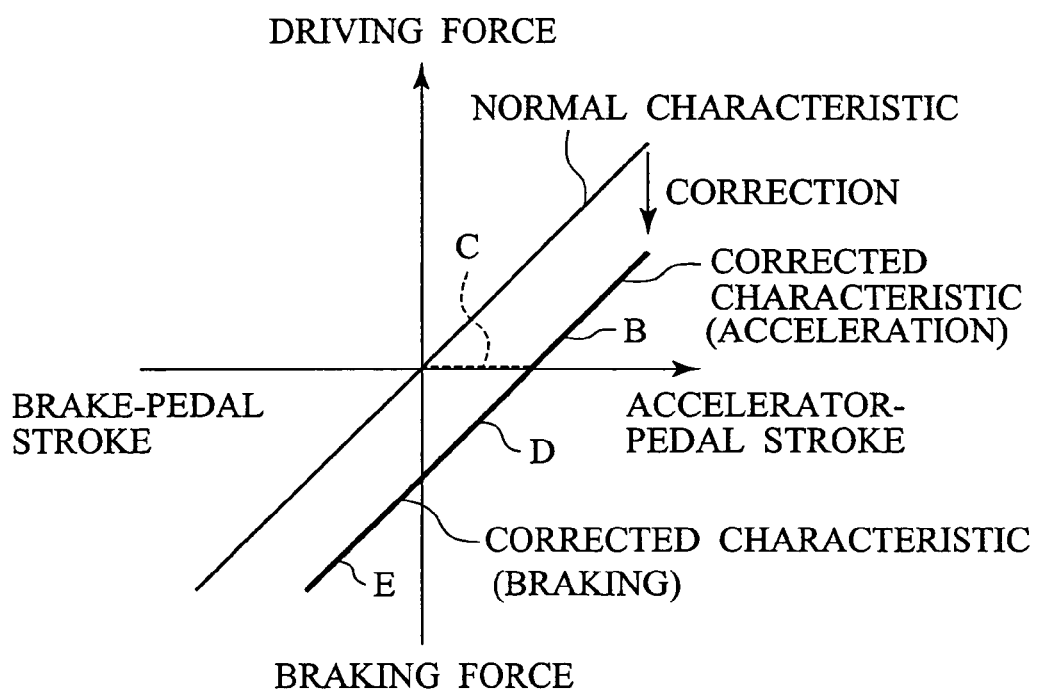
FIG. 22 is a characteristic diagram showing driving force and braking force corrected according to a correction value Fc.

FIG. 22 briefly shows the characteristics of driving force and braking force that are corrected according to the correction value Fc. In FIG. 22, if the accelerator-pedal stroke is large, the driving force (driver demanded driving force) corresponding to the accelerator-pedal stroke is reduced according to the corrected value Fc as depicted by "B" in FIG. 22. On the other hand, if the accelerator-pedal stroke is small, the driving force (driver demanded driving force) corresponding to the accelerator-pedal stroke is corrected to zero (i.e., the driver demanded driving force being zeroed) as depicted by "C" in FIG. 22, and in addition, a correction is made to generate a braking force that becomes weaker as the accelerator-pedal stroke increases ("D" in FIG. 22). If the brake pedal 3 is pressed, the braking force is corrected to increase according to the correction value Fc ("E" in FIG. 22). In this way, a driver demanded driving force corresponding to an accelerator-pedal stroke is corrected by a correction value Fc to provide a net driving force FT. The correction value Fc provides a negative acceleration for the vehicle.

The drive control system of the present invention sets various parameters (step S8) according to the classification of a road on which the own vehicle is running and the speed of the own vehicle as mentioned above. When the own vehicle is running on an express way, the drive control system sets the absolute collision time threshold THW_Th (related to the length of the virtual spring 501) to become smaller as the own vehicle speed Vh increases (continuous line in FIG. 13), the absolute collision time control gain k_THW (related to the counter force of the virtual spring 501) to become smaller as the own vehicle speed Vh increases (continuous line in FIG. 14), the relative collision time threshold TTC_Th (related to the length of the virtual spring 502) to become larger as the own vehicle speed Vh increases (continuous line in FIG. 15), and the relative collision time control gain k_TTC (related to the counter force of the virtual spring 502) to become larger as the own vehicle speed Vh increases (continuous line in FIG. 16).

Figure 14:
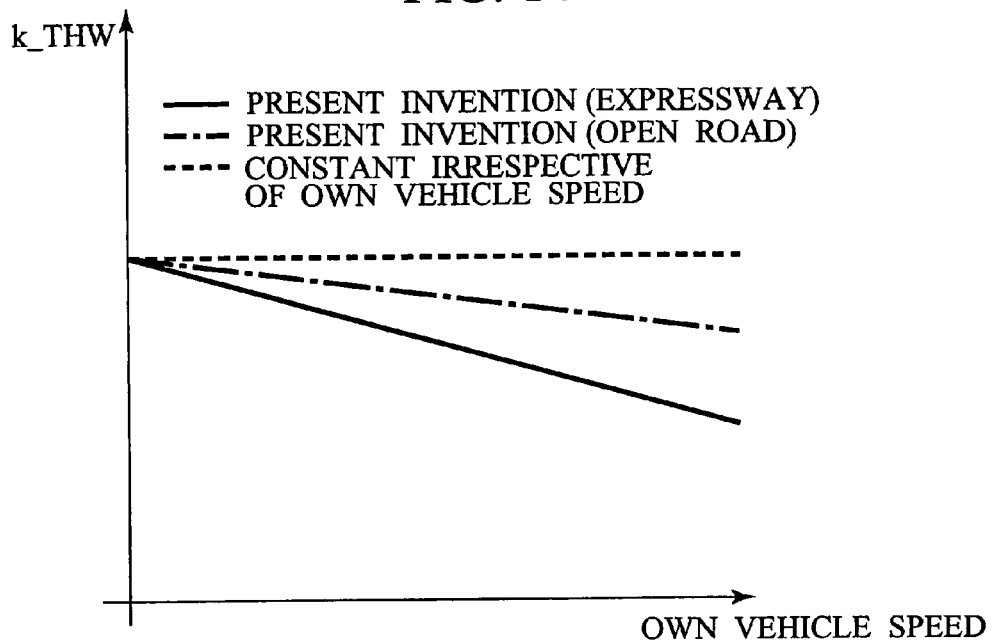
FIG. 14 explains the setting of an absolute collision time control gain k_THW in the parameter setting step of FIG. 12.
Figure 16:
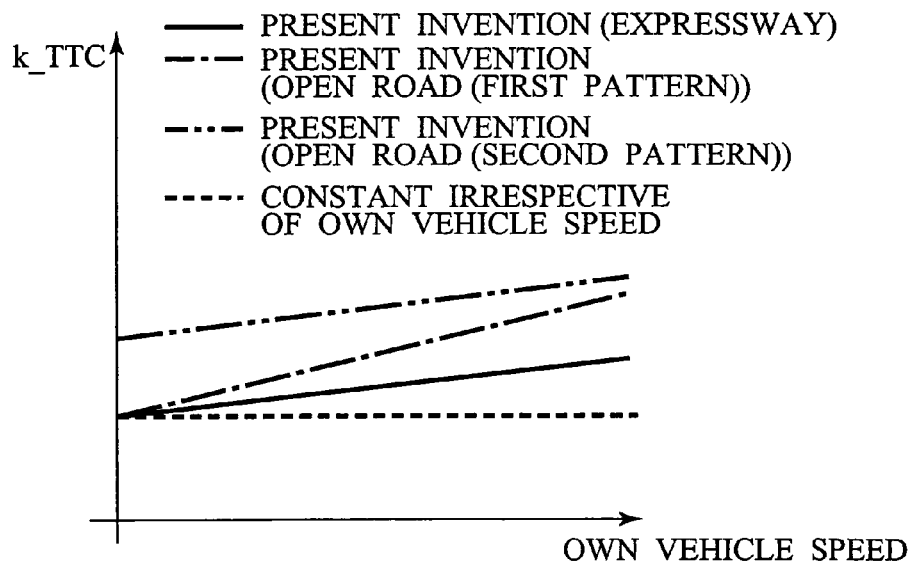
FIG. 16 explains the setting of a relative collision time control gain k_TTC in the parameter setting step of FIG. 12.

On the other hand, when the own vehicle is running on an open road, the drive control system sets all of the parameters to be greater than those for the expressway (dot-and-dash line in FIG. 13, dot-and-dash line in FIG. 14, dot-and-dash line or two-dots-and dash line in FIG. 15, and dot-and-ash line or two-dots-and ash line in FIG. 16).

The absolute collision time threshold THW_Th is related to the length L_THW of the virtual spring 501 through the expression (7) and is reflected on the timing of a contact possibility warning made by a braking force generated by the first counter force F_THW. The absolute collision time control gain k_THW is the elastic coefficient of the virtual spring 501, and therefore, is reflected on the size of the first counter force F_THW through the expression (8). The relative collision time threshold TTC_Th is related to the length L_TTC of the virtual spring 502 through the expression (9) and is reflected on the timing of a contact possibility made by a braking force generated according to the second counter force F_TTC. The relative collision time control gain k_TTC is the elastic coefficient of the virtual spring 502, and therefore, is reflected on the size of the second counter force F_TTC through the expression (10).

The vehicle speed dependence of the absolute collision time threshold THW_Th shown in FIG. 13 can be expressed with the following expressions (11), (12), and (13) for the related art (dotted line in FIG. 13), an open road of the present invention (dot-and-dash line in FIG. 13), and an expressway of the present invention (continuous line in FIG. 13), respectively:

$$THW\_Th = THW\_Th0 \quad (11)$$

$$THW\_Th = THW\_Th1 - A1 \cdot Vh \quad (12)$$

$$THW\_Th = THW\_Th2 - A2 \cdot Vh \quad (13)$$

where the coefficients A1 and A2 represent dependence on the vehicle speed and have a relationship of $0 < A1 < A2$. In the example of FIG. 13, there is a condition of THW_Th1=THW_Th2=THW_Th0.

Accordingly, the expression (7) can be rewritten into the following expressions (14) and (15) for the open road and expressway, respectively:

$$L\_THW = THW\_Th0 \cdot Vh - A1 \cdot Vh^2 \quad (14)$$

$$L\_THW = THW\_Th0 \cdot Vh - A2 \cdot Vh^2 \quad (15)$$

Compared with the expression (7), the second term on the right side of each of the expressions (14) and (15) has an effect of relatively shortening the natural length L_THW of the virtual spring 501 as the vehicle speed Vh increases. Namely, irrespective of whether the road on which the own vehicle is running is an expressway or an open road, the natural length of the virtual spring as an elastic body 501 becomes shorter than that of the related art as the vehicle speed increases, and therefore, the start of control by the net driving force FT due to the first counter force F_THW is relatively delayed. Similarly, the elastic coefficient of the virtual spring 501 becomes smaller compared with that of the related art (dotted line in FIG. 14), and therefore, the net driving force FT becomes smaller with respect to the same object-to-object distance.

On the other hand, due to the above-mentioned reason, the expression (9) can be rewritten into the following expressions (16), (17), (18), and (19) for the related art (dotted line in FIG. 15), a first case of open road of the present invention (dot-and-ash line in FIG. 15), a second case of open road of the present invention (two-dots-and dash line in FIG. 15), and an expressway of the present invention, respectively:

$$L\_TTC = TTC\_Th0 \cdot Vr \quad (16)$$

$$L\_TTC = TTC\_Th0 \cdot Vr + B1 \cdot Vr^2 \quad (17)$$

$$L\_TTC = TTC\_Th1 \cdot Vr + B2 \cdot Vr^2 \quad (18)$$

$$L\_TTC = TTC\_Th0 \cdot Vr + B3 \cdot Vr^2 \quad (19)$$

where the coefficients B1, B2, and B3 represent the vehicle speed dependence of the respective cases and have a relationship of $0 < B3$, or $B2 < B1$, and there is a relationship of TTC_Th0<TTC_Th1. Accordingly, the natural length L_TTC of the virtual spring 502 becomes longer than that of the related art (dotted line in FIG. 15), and therefore, the start timing of the control by the net driving force FT due to the second counter force F_TTC is made relatively earlier. Similarly, the elastic coefficient of the virtual spring 502 becomes larger compared with that of the related art (dotted line in FIG. 16), and therefore, the net driving force FT becomes larger with respect to the same object-to-object distance.

In other words, compared with the related art, the start timing of the control of a braking force (net driving force FT) due to the first counter force F_THW is made earlier and the size thereof becomes larger as the vehicle speed becomes slower. At this time, the start timing of the control of a braking force due to the second counter force F_TTC is delayed and the size thereof becomes smaller.

When the own vehicle is running on an open road, the timing of a contact possibility warning activated by a braking force based on any one of the first and second counter forces F_THW and F_TTC becomes earlier and the magnitude thereof becomes larger compared with those when running on an expressway.

Next, the effects of the present invention will be explained. As mentioned above, the counter force of a virtual spring is calculated according to a state of the own vehicle approaching a front vehicle. The calculated counter force is used as an absolute correction value. To provide the absolute correction value, a driving force correction value and a braking force correction value are provided to the driving force controller 10 and braking force controller 20 to correct a driver demanded driving force and a driver demanded braking force. When the own vehicle approaches a front vehicle to some extent as shown in FIG. 22, dull acceleration (acceleration against the intention of the driver) corresponding to the counter force is applied to the own vehicle (B in FIG. 22), or decelerate the own vehicle (D, E in FIG. 22) to provide the driver with a contact possibility warning.

The model mentioned above may be configured to increase the counter force as the own vehicle approaches a front vehicle. In this case, driving resistance on the own vehicle gradually increases as the own vehicle approaches the front vehicle. Namely, the driving resistance successively changes as a contact possibility of the own vehicle contacting with the front vehicle increases, to provide the driver with a contact possibility warning. The driver can sense the increasing contact possibility of the own vehicle contacting with the front vehicle in proportion to the increasing driving resistance.

As mentioned above, as the speed of the own vehicle increases, a object-to-object distance in which the first counter force F_THW is applied as a first negative driving force becomes shorter, and therefore, the start timing of the first negative driving force is delayed and the magnitude thereof becomes smaller. On the other hand, an object-to-object distance in which the second counter force F_TTC is applied as a second negative driving force becomes longer, and therefore, the start timing of the second negative driving force is made earlier and the magnitude thereof becomes larger. As a result, when the distance to a front vehicle is long, the timing of a contact possibility warning made by the first negative driving force is delayed, and the magnitude thereof corresponding to the intensity of the contact possibility warning becomes smaller. This prevents an excessive deceleration serving as a contact possibility warning to annoy the driver. In this case, the timing of a contact possibility warning made by the second negative driving force is quick and the magnitude thereof corresponding to the intensity of a contact possibility warning is large. Accordingly, even if the front vehicle decelerates during high-speed driving, the second negative driving force is readily applied to the own vehicle to sufficiently provide the driver with a contact possibility warning to secure the safety.

If the own vehicle is driving at low speed, the object-to-object distance in which the first counter force F_THW provides the first negative driving force becomes longer to quicken the start timing of the first negative driving force and increase the magnitude thereof. At the same time, the object-to-object distance in which the second counter force F_TTC provides the second negative driving force becomes shorter to delay the start timing of the second braking force and decrease the magnitude thereof. Generally, a object-to-object distance is short when a vehicle is driving at low speed. During the slow-speed driving, if the object-to-object distance becomes further shorter, it is necessary to surely provide the driver with a contact possibility warning. Accordingly, when the distance to a front vehicle is short, the timing of a contact possibility warning made by the first negative driving force based on the absolute collision time THW is made earlier and the magnitude thereof is increased to provide the driver with a sufficient contact possibility warning. In this case, the timing of a contact possibility warning by the second negative driving force is delayed and the magnitude thereof is decreased to prevent an excessive contact possibility warning by deceleration of the own vehicle at a short object-to-object distance, thereby preventing the annoyance of the driver.

As mentioned above, when the own vehicle is running along an open road, the timing of a contact possibility warning by the first and second negative driving forces is quickened and the intensity of the contact possibility warning is increased compared with those for an expressway. Generally, a possibility of deceleration of a front vehicle is high on an open road. Accordingly, when the own vehicle is driving on an open road, the timing of a contact possibility warning by the first and second negative driving forces is made earlier and the intensity of the contact possibility warning is increased compared with those for an expressway, to make the warning more effective.

Various embodiments of the present invention have been explained. The present invention, however, is not limited to the embodiments. The embodiments mentioned above increase the relative collision time threshold TTC_Th and relative collision time control gain k_TTC as the own vehicle speed increases. This does not limit the present invention. For example, only one of the relative collision time threshold TTC_Th and relative collision time control gain k_TTC may be increased according to the own vehicle speed. For example, increasing the relative collision time threshold TTC_Th corresponds to elongating the natural length of the virtual spring 502, to quicken the timing of a contact possibility warning based on the relative collision time TTC. This results in increasing the second counter force F_TTC defined by the relative collision time threshold TTC_Th and the expression (10) with respect to the same object-to-object distance X. Namely, increasing the relative collision time threshold TTC_Th results in increasing the second counter force F_TTC like increasing the relative collision time control gain k_TTC.

Similarly, the embodiments mentioned above decrease the absolute collision time threshold THW_Th and absolute collision time control gain k_THW as the own vehicle speed increases. This does not limit the present invention. Only one of the absolute collision time threshold THW_Th and absolute collision time control gain k_THW may be decreased. For example, decreasing the absolute collision time threshold THW_Th corresponds to shortening the natural length of the virtual spring 501, and therefore, results in delaying the timing of a contact possibility warning based on the absolute collision time THW. As a result, the first counter force F_THW defined by the absolute collision time threshold THW_Th and the expression (8) becomes smaller with respect to the same object-to-object distance X. Consequently, reducing the absolute collision time threshold THW_Th results in reducing the first counter force F_THW similarly to reducing the absolute collision time control gain k_THW. Reducing the absolute collision time threshold THW_Th has an original effect of delaying the timing of a contact possibility warning based on the absolute collision time THW.

The embodiments mentioned above calculate a correction value Fc by setting a virtual spring in front of the own vehicle. This does not limit the present invention. Parameters that are functions of a object-to-object distance may be calculated with the use of other techniques. In the explanations of the embodiments mentioned above, the process of step S6 of FIG. 9 carried out by the primary controller 5 realizes a relative collision time calculator to calculate a relative collision time (a second collision time) by dividing the distance between the own vehicle and an object that is present in front of the own vehicle by a relative speed between the own vehicle and the front object. The processes of steps S1, S2, and S4 to S7 of FIG. 9 carried out by the primary controller 5, the radar 30, and the object detecting processor 2 realize a contact possibility detector to detect a possibility of the own vehicle contacting the front object according to the relative collision time calculated by the relative collision time calculator. Namely, the relative collision time calculator and contact possibility detector realize an operation unit to carry out an operation of providing a contact possibility of the own vehicle contacting with the front object according to relative motion between the own vehicle and the front object. The processes of steps S9 and S10 of FIG. 9 carried out by the primary controller 5 realize a first part of a warning unit that provides a contact possibility warning by changing at least one of driving torque and braking torque according to the contact possibility detected by the contact possibility detector and by applying a braking force corresponding to the relative collision time to the own vehicle. The processes of steps S22 and S23 of FIG. 12 (the process of step S8 of FIG. 9) carried out by the primary controller 5 realize a controller to increase the braking force corresponding to the relative collision time as the speed of the own vehicle increases.

The process of step S6 of FIG. 9 carried out by the primary controller 5 realizes an absolute collision time calculator to calculate an absolute collision time (a first collision time) by dividing the distance between the own vehicle and an object that is present in front of the own vehicle by the speed of the own vehicle. The processes of steps S1, S2, and S4 to S7 of FIG. 9 carried out by the primary controller 5, the radar 30, and the object detecting processor 2 realize a contact possibility detector to detect the possibility of the own vehicle contacting with the front object according to the absolute collision time calculated by the absolute collision time calculator. The collision time calculator and contact possibility detector realize an operation unit to carry out an operation of providing a contact possibility of the own vehicle contacting the front object. The processes of steps S9 and S10 of FIG. 9 carried out by the primary controller 5 realize a second part of the warning unit that provides a contact possibility warning by changing at least one of driving torque and braking torque according to the contact possibility detected by the contact possibility detector and by applying a braking force corresponding to the absolute collision time to the own vehicle. The processes of steps S22 and S23 of FIG. 12 (the process of step S8 of FIG. 9) carried out by the primary controller 5 realize a controller to reduce the braking force corresponding to the absolute collision time as the speed of the own vehicle increases.

According to the present invention, a braking force is corrected more greatly as the speed of the own vehicle increases. Therefore, even if there is a sufficient distance between the own vehicle and a front vehicle to reduce the intensity of a braking force for a contact possibility warning made according to the object-to-object distance, the present invention can properly provide the driver with a contact possibility warning when the front vehicle decelerates. Namely, the present invention can effectively provide the driver with a contact possibility warning without annoying the driver.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An information providing apparatus for a vehicle, comprising:
    an operation part configured to provide a contact possibility of the vehicle contacting with an object that is present in front of the vehicle according to relative motion between the vehicle and the object;
    an information providing unit configured to provide contact possibility information by applying a negative acceleration to the vehicle, the negative acceleration being produced according to a correction value that is set by the information providing unit according to the contact possibility and is applied to at least one of the driving force and the braking force of the vehicle; and
    a controller configured to change the correction value according to a speed of the vehicle.

2. The information providing apparatus of claim 1, wherein:
    the information providing unit sets a first correction value according to a first collision time, to produce the negative acceleration, the first collision time being provided by the operation part according to a distance between the vehicle and the front object and a speed of the vehicle; and
    the controller changes the first correction value such that the first correction value decreases as the speed of the vehicle increases.

3. The information providing apparatus of claim 1, wherein:
    the information providing unit sets a second correction value according to a second collision, time, to produce the negative acceleration, the second collision time being provided by the operation part according to a distance between the vehicle and the front object and a relative speed between the vehicle and the front object; and
    the controller changes the second correction value such that the second correction value increases as the speed of the vehicle increases.

4. The information providing apparatus of claim 2, wherein:
    the information providing unit sets a second correction value according to a second collision time, which is provided by the operation part according to the distance between the vehicle and the front object and a relative speed between the vehicle and the front object, and selects a larger one of the first and second correction values to produce the negative acceleration; and
    the controller changes the second correction value such that the second correction value increases as the speed of the vehicle increases.

5. The information providing apparatus of claim 4, wherein the second correction value is set according to a comparison between the second collision time and a second threshold.

6. The information providing apparatus of claim 5, wherein the first correction value is set according to a comparison between the first collision time and a first threshold.

7. The information providing apparatus of claim 6, wherein the first correction value is set to zero in a case where the first collision time is greater than the first threshold, and in other cases, is increased as the first collision time decreases.

8. The information providing apparatus of claim 5, wherein the second correction value is set to zero in a case where the second collision time is greater than the second threshold, and in other cases, is increased as the second collision time decreases.

9. The information providing apparatus of claim 4, further comprising:
a classifier configured to classify a road on which the vehicle is running, wherein
in a case where the classifier classifies the road as an open road, the controller increases the first correction value than that for an expressway.

10. The information providing apparatus of claim 9, wherein in a case where the classifier classifies the road as an open road, the controller uses a greater second correction value than that for an expressway.

11. The information providing apparatus of claim 4, further comprising:
a classifier configured to classify a road on which the vehicle is running, wherein
in a case where the classifier classifies the road as an open road, the controller uses a greater second correction value than that for an expressway.

12. The information providing apparatus of claim 1, wherein the controller is configured to determine the correction value based upon a virtual member.

13. The information providing apparatus of claim 12, wherein the virtual member includes a first virtual elastic member;
wherein the first virtual elastic member is related to an absolute collision time;
wherein a first counter force is determined according to the first virtual elastic member.

14. The information providing apparatus of claim 12, wherein the virtual member includes a first virtual elastic member, wherein the first virtual elastic member is related to an absolute collision time, wherein a first counter force is determined according to the first virtual elastic member;
wherein the virtual member includes a second virtual elastic member, wherein the second virtual elastic member is related to a relative collision time, wherein a second counter force is determined according to the second virtual elastic member;
wherein the correction value is determined according to the first counter force and the second counter force.

15. An information providing apparatus for a vehicle, comprising:
an operation means configured to provide a contact possibility of the vehicle contacting with an object that is present in front of the vehicle according to relative motion between the vehicle and the object;
an information providing means configured to provide contact possibility information by applying a negative acceleration to the vehicle, the negative acceleration being produced according to a correction value that is set by the information providing means according to the contact possibility and is applied to at least one of the driving force and the braking force of the vehicle; and
a control means configured to change the correction value according to a speed of the vehicle.

16. An information providing method for a vehicle, comprising:
providing a contact possibility of the vehicle contacting with an object that is present in front of the vehicle according to relative motion between the vehicle and the object;
providing contact possibility information by producing a negative acceleration according to a correction value that is set according to the contact possibility and is applied to at least one of the driving force and the braking force of the vehicle; and
changing the correction value according to a speed of the vehicle.

17. An information providing apparatus for a vehicle, comprising:
an operation part configured to provide a contact possibility of the vehicle contacting with an object that is present in front of the vehicle according to relative motion between the vehicle and the object;
an information providing unit configured to provide contact possibility information by applying a negative acceleration to the vehicle, the negative acceleration being produced according to a correction value that is set by the information providing unit according to the contact possibility and is applied to at least one of the driving force and the braking force of the vehicle; and
a controller configured to change the correction value according to a speed of the vehicle;
wherein the controller is configured to determine the correction value based upon a counter force;
wherein the controller is configured to determine a collision time;
wherein the controller is configured to determine a collision time threshold;
wherein the controller is configured to determine if the collision time is less than the collision time threshold, wherein if the collision time is not less than the collision time threshold the counter force is set to be zero, and wherein if the collision time is less than the collision time threshold, the counter force is determined.

18. The information providing apparatus of claim 17, wherein the collision time includes a first collision time based upon a distance between the vehicle and the object, and upon the speed of the vehicle;
wherein the collision time threshold includes a first collision time threshold.

19. The information providing apparatus of claim 18, wherein the collision time includes a second collision time based upon the distance between the vehicle and the object, and upon a relative speed between the vehicle and the object;
wherein the collision time threshold includes a second collision time threshold.

20. The information providing apparatus of claim 18, wherein the counter force includes a first counter force based upon a first virtual elastic member with a first spring length and a first elastic coefficient.

21. The information providing apparatus of claim 20, wherein the first counter force is determined on the basis of the first elastic coefficient, the first spring length, and the distance between the vehicle and the object.

22. The information providing apparatus of claim 20, wherein the counter force includes a second counter force based upon a second virtual elastic member with a second spring length and a second elastic coefficient.

23. The information providing apparatus of claim 22, wherein the second counter force is determined on the basis of the second elastic coefficient, the second spring length, and the distance between the vehicle and the object.

24. The information providing apparatus of claim 22, further comprising:
a classifier configured to classify a road on which the vehicle is running;
wherein the collision time includes a second collision time based upon the distance between the vehicle and the object, and upon a relative speed between the vehicle and the object;
wherein the collision time threshold includes a second collision time threshold;
wherein the second collision time threshold depends upon the speed of the vehicle and a classified road type that is determined by the classifier;
wherein the second elastic coefficient depends upon the speed of the vehicle and a classified road type that is determined by the classifier.

25. The information providing apparatus of claim 22, wherein the collision time includes a second collision time based upon the distance between the vehicle and the object, and upon a relative speed between the vehicle and the object;
wherein the collision time threshold includes a second collision time threshold;
wherein the controller is configured to determine the second spring length on the basis of the second collision time threshold and the relative speed between the vehicle and the object.

26. The information providing apparatus of claim 22, wherein the collision time includes a second collision time based upon the distance between the vehicle and the object, and upon a relative speed between the vehicle and the object;
wherein the collision time threshold includes a second collision time threshold;
wherein the controller is configured to determine if the second collision time is less than the second collision time threshold, wherein if the second collision time is not less than the second collision time threshold the second counter force is set to be zero, and wherein if the second collision time is less than the second collision time threshold, the second counter force is determined on the basis of the second elastic coefficient, the second spring length, and the distance between the vehicle and the object.

27. The information providing apparatus of claim 22, wherein the controller is configured to set the correction value as the larger of the first counter force and the second counter force.

28. The information providing apparatus of claim 27, wherein the controller is configured to estimate a driver demanded force and determine if the driver demanded force is greater than or equal to the correction value;
wherein the controller is configured so that when the driver demanded force is relatively large, the driver demanded force is reduced when the correction value has a nonzero value;
wherein the controller is configured so that when the driver demanded force is relatively small, the driver demanded force is reduced to zero and a braking force is generated when the correction value has a nonzero value; and
wherein the controller is configured so that when a brake pedal is depressed, the braking force is increased when the correction value has a nonzero value.

29. The information providing apparatus of claim 28, wherein if the driver demanded force is greater than or equal to the correction value, the controller provides a negative value of the correction value as a driving force correction value, and the controller sets a braking force correction value at zero;
wherein if the driver demanded force is smaller than the correction value, the controller provides a negative value of the driver demanded force as the driving force correction value, and the controller provides the difference between the correction value and the driver demanded force as the braking force correction value.

30. The information providing apparatus of claim 28, wherein the controller is configured so that when the driver demanded force is greater than the correction value, the controller reduces the driving force of the vehicle according to the correction value, and the controller sets a braking force correction value at zero;
wherein the controller is configured so that when the driver demanded force is smaller than the correction value, the controller sets the driving force of the vehicle to zero, and the controller generates a braking force;
wherein the controller is configured so that when the controller detects that a brake pedal is depressed, the controller increases a demanded braking force by the correction value.

31. The information providing apparatus of claim 20, further comprising:
a classifier configured to classify a road on which the vehicle is running;
wherein the first collision time threshold depends upon the speed of the vehicle and a classified road type that is determined by the classifier;
wherein the first elastic coefficient depends upon the speed of the vehicle and a classified road type that is determined by the classifier.

32. The information providing apparatus of claim 20, wherein the controller is configured to determine the first spring length on the basis of the first collision time threshold and the speed of the vehicle.

33. The information providing apparatus of claim 17, wherein the counter force is based upon a virtual member.

34. A vehicle, comprising:
an information providing apparatus that includes an operation part configured to provide a contact possibility of the vehicle contacting with an object that is present in front of the vehicle according to relative motion between the vehicle and the object;
an information providing unit configured to provide contact possibility information by applying a negative acceleration to the vehicle, the negative acceleration being produced according to a correction value that is set by the information providing unit according to the contact possibility and is applied to at least one of driving force and braking force of the vehicle; and
a controller configured to change the correction value according to a speed of the vehicle.

* * * * *